(12) United States Patent
Hashimoto et al.

(10) Patent No.: US 10,738,618 B2
(45) Date of Patent: Aug. 11, 2020

(54) GAS TURBINE ROTOR, GAS TURBINE, AND GAS TURBINE EQUIPMENT

(71) Applicant: Mitsubishi Hitachi Power Systems, Ltd., Kanagawa (JP)

(72) Inventors: Shinya Hashimoto, Yokohama (JP); Keita Takamura, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 166 days.

(21) Appl. No.: 15/768,709

(22) PCT Filed: Oct. 21, 2016

(86) PCT No.: PCT/JP2016/081299
§ 371 (c)(1),
(2) Date: Apr. 16, 2018

(87) PCT Pub. No.: WO2017/069249
PCT Pub. Date: Apr. 27, 2017

(65) Prior Publication Data
US 2019/0063224 A1 Feb. 28, 2019

(30) Foreign Application Priority Data
Oct. 23, 2015 (JP) .................................. 2015-208944

(51) Int. Cl.
*F01D 5/08* (2006.01)
*F02C 7/18* (2006.01)
(Continued)

(52) U.S. Cl.
CPC ............... *F01D 5/087* (2013.01); *F01D 5/08* (2013.01); *F01D 5/081* (2013.01); *F01D 5/082* (2013.01);
(Continued)

(58) Field of Classification Search
CPC . F01D 5/08; F01D 5/081; F01D 5/082; F01D 5/087; F02C 3/073; F02C 6/08;
(Continued)

(56) References Cited

U.S. PATENT DOCUMENTS

| 3,742,706 A | 7/1973 | Klompas |
| 7,585,148 B2 * | 9/2009 | Hoell ...................... F01D 5/026 415/115 |

(Continued)

FOREIGN PATENT DOCUMENTS

| JP | 48-080913 | 10/1973 |
| JP | 11-125199 | 5/1999 |
| JP | 2004-218480 | 8/2004 |
| JP | 2009-013981 | 1/2009 |

(Continued)

OTHER PUBLICATIONS

International Search Report dated Dec. 27, 2016 in International (PCT) Application No. PCT/JP2016/081299.
(Continued)

*Primary Examiner* — Justin D Seabe
*Assistant Examiner* — Christopher R Legendre
(74) *Attorney, Agent, or Firm* — Wenderoth, Lind & Ponack, L.L.P.

(57) ABSTRACT

A ventilation flow path, a cooling air flow path, a mixing space, and a mixed air flow path are formed in a gas turbine rotor. The ventilation flow path guides compressed air farther on an axially upstream side than an air discharge port of a compressor to an interior of a compressor rotor as compressor extracted air. The cooling air flow path guides cooling air to a part farther on an axially downstream side than the air discharge port. The compressor extracted air and the cooling air are mixed in the mixing space. The mixed air flow path guides mixed air containing the compressor extracted air and the cooling air into a turbine rotor.

11 Claims, 11 Drawing Sheets

(51) Int. Cl.
*F02C 3/073* (2006.01)
*F04D 29/053* (2006.01)
*F04D 29/58* (2006.01)
*F02C 6/08* (2006.01)
*F04D 29/32* (2006.01)

(52) U.S. Cl.
CPC ............... *F02C 3/073* (2013.01); *F02C 6/08* (2013.01); *F02C 7/18* (2013.01); *F04D 29/053* (2013.01); *F04D 29/321* (2013.01); *F04D 29/584* (2013.01); *F05D 2220/321* (2013.01); *F05D 2240/24* (2013.01); *F05D 2260/211* (2013.01); *F05D 2260/213* (2013.01); *F05D 2260/97* (2013.01); *Y02T 50/676* (2013.01)

(58) Field of Classification Search
CPC ........ F02C 7/18; F04D 29/053; F04D 29/321; F04D 29/584; F05D 2260/211; F05D 2260/213
See application file for complete search history.

(56) References Cited

U.S. PATENT DOCUMENTS

| | | | |
|---|---|---|---|
| 10,018,360 B2* | 7/2018 | Suciu | F01D 9/06 |
| 2008/0041064 A1* | 2/2008 | Moore | F01D 5/081 |
| | | | 60/782 |
| 2009/0304495 A1 | 12/2009 | Bart et al. | |
| 2013/0259685 A1 | 10/2013 | Are et al. | |
| 2018/0051710 A1* | 2/2018 | Takamura | F02C 7/18 |
| 2019/0063224 A1* | 2/2019 | Hashimoto | F01D 5/08 |

FOREIGN PATENT DOCUMENTS

JP 2013-204593 10/2013

OTHER PUBLICATIONS

Written Opinion of the International Searching Authority dated Dec. 27, 2016 in International (PCT) Application No. PCT/JP2016/081299.

* cited by examiner

GAS TURBINE ROTOR, GAS TURBINE, AND GAS TURBINE EQUIPMENT

TECHNICAL FIELD

The present invention relates to a gas turbine rotor, a gas turbine, and gas turbine equipment.

This application claims priority based on Japanese Patent Application No. 2015-208944 filed in Japan on Oct. 23, 2015, the contents of which are incorporated herein by reference.

BACKGROUND ART

A gas turbine is provided with a compressor for generating compressed air by compressing air, a combustor for generating a combustion gas by burning a fuel in the compressed air, and a turbine driven by the combustion gas. The compressor has a compressor rotor that rotates around an axial line and a compressor casing covering the compressor rotor. The turbine has a turbine rotor that rotates around the axial line and a turbine casing covering the turbine rotor. Both the compressor rotor and the turbine rotor have a rotor shaft and a plurality of blade rows attached to an outer circumference of the rotor shaft. A gas turbine rotor is formed by placing the compressor rotor and the turbine rotor on the same axial line and connecting them together. Furthermore, a gas turbine casing is formed by connecting the compressor casing and the turbine casing together.

Of the gas turbine rotor, the turbine rotor is exposed to high-temperature combustion gas, and therefore the rotor must be cooled using air, and the like.

A technology for cooling a turbine rotor using compressed air from a compressor is disclosed in Patent Document 1. With this technology, compressed air extracted from a middle stage of the compressor is guided into a compressor rotor of the gas turbine rotor, which compressed air is then guided from the compressor rotor to a turbine rotor to cool said turbine rotor.

PRIOR ART DOCUMENTS

Patent Documents

Patent Document 1: JP 2004-218480 A

SUMMARY OF THE INVENTION

Problem to be Solved by the Invention

In recent years, the temperature of combustion gas supplied to turbines has risen in conjunction with the increased efficiency of gas turbines. Therefore, it is becoming increasingly likely that even in a case where compressed air extracted from a middle stage of a compressor is guided as-is to a turbine rotor to cool said turbine rotor, as with the technology according to Patent Document 1, it will be impossible to adequately cool the turbine rotor.

Thus, an object of the present invention is to provide a technology that is able to better cool a turbine rotor of a gas turbine rotor.

Means for Solving the Problem

A gas turbine rotor of a first aspect according to the invention for achieving the aforementioned object is a gas turbine rotor that rotates around an axial line inside a gas turbine casing, and includes a compressor rotor of a compressor that rotates around the axial line, and a turbine rotor of a turbine, positioned on the axial line and connected to the compressor rotor, that rotates integrally with the compressor rotor around the axial line, wherein the gas turbine rotor has the following formed therein: a ventilation flow path for guiding compressed air flowing inside the gas turbine casing, farther on an axially upstream side than an air discharge port of the compressor, to an interior of the compressor rotor; a cooling air flow path for guiding cooling air having a lower temperature than the compressed air flowing through the ventilation flow path to a part farther on an axially downstream side than the air discharge port; a mixing space which is connected to the ventilation flow path and the cooling air flow path, and in which the compressed air that has flowed through the ventilation flow path and the cooling air that has flowed through the cooling air flow path are mixed; and a mixed air flow path that is connected to the mixing space and guides mixed air generated by the mixing of the compressed air and the cooling air into the turbine rotor.

With the gas turbine rotor, the ventilation flow path is formed in the compressor rotor, so the interior of the compressor rotor is ventilated by the compressed air flowing through the ventilation flow path. Therefore, with the gas turbine rotor, the thermal responsiveness of the compressor rotor with respect to a temperature change in an air compression flow path where air is compressed by the compressor can be increased. Furthermore, with the gas turbine rotor, compressed air that has flowed through the ventilation flow path of the compressor rotor and cooling air are mixed in the mixing space, and mixed air generated by this mixing is guided into the turbine rotor.

Therefore, with the gas turbine rotor, the turbine rotor can be cooled by air having a lower temperature than in a case where compressed air that has flowed out from a compressor rotor shaft is supplied as-is to a turbine rotor shaft. Moreover, with the gas turbine rotor, the compressed air that has flowed out from the ventilation flow path of the compressor rotor can be effectively used to cool the turbine rotor.

A gas turbine rotor of a second aspect according to the invention for achieving the aforementioned object is the gas turbine rotor according to the first aspect, further including an intermediate rotor shaft that is positioned on the axial line between the compressor rotor and the turbine rotor and connected to the compressor rotor and the turbine rotor, wherein the cooling air flow path and the mixing space are formed in the intermediate rotor shaft.

A gas turbine rotor of a third aspect according to the invention for achieving the aforementioned object is the gas turbine rotor according to the first or second aspect, wherein the turbine rotor has a turbine rotor shaft that rotates around the axial line, and a plurality of blade rows attached to an outer circumference of the turbine rotor shaft and aligned in an axial direction, and wherein the mixed air flow path is connected through the interior of the turbine rotor shaft to a blade row farther on the axially downstream side than a first blade row that is farthest on the axially upstream side of the plurality of blade rows.

A gas turbine rotor of a fourth aspect according to the invention for achieving the aforementioned object is the gas turbine rotor according to the third aspect, wherein, in addition to a first cooling air flow path which is the cooling air flow path connected to the mixing space, a second cooling air flow path for guiding the cooling air to the first blade row is also formed.

With the gas turbine rotor, the first blade row, which is the row of the plurality of blade rows of the turbine rotor exposed to highest-temperature combustion gas, can be cooled using low-temperature cooling air.

A gas turbine rotor of a fifth aspect according to the invention for achieving the aforementioned object is the gas turbine rotor according to the fourth aspect, wherein a third cooling air flow path linking the second cooling air flow path and the mixed air flow path is formed in the turbine rotor.

With this gas turbine rotor, mixed air containing the mixed air and the cooling air flowing through the mixed air flow path can be supplied to a blade row farther on the axially downstream side than the first blade row. Therefore, with the gas turbine rotor, the blade row farther on the axially downstream side than the first blade row can be cooled in a greater degree.

A gas turbine rotor of a sixth aspect according to the invention for achieving the aforementioned object is the gas turbine rotor according to any one of the first through the fifth aspects, wherein the compressor rotor has a compressor rotor shaft that rotates around the axial line, and a plurality of blade rows attached to an outer circumference of the compressor rotor shaft and aligned in the axial direction, and wherein the ventilation flow path has an introduction part for guiding the compressed air flowing between two blade rows adjacent in the axial direction of the plurality of blade rows of the compressor rotor to an interior of the compressor rotor, a plurality of branch parts which branch from the introduction part and are formed in mutually different positions in the axial direction, and into which the compressed air flows from the introduction part, and a collection part which is connected to each of the plurality of branch parts, into which the compressed air flows after passing through the plurality of branch parts, and through which the compressed air that has flowed in flows out to the mixing space.

With the gas turbine rotor, because the plurality of branch parts are formed in the compressor rotor, the interior of the compressor rotor can be ventilated over a wide range in the compressor rotor.

A gas turbine of a seventh aspect according to the invention for achieving the aforementioned object is provided with the gas turbine rotor according to any one of the first through the sixth aspects, and the gas turbine casing.

Gas turbine equipment of an eighth aspect of the invention for achieving the aforementioned object is provided with the gas turbine according to the seventh aspect, and a cooling system for generating the cooling air by cooling the compressed air which is the air compressed in the compressor of the gas turbine, wherein the gas turbine has a cooling air introduction member for guiding the cooling air generated in the cooling system to the cooling air flow path of the gas turbine rotor.

Effect of the Invention

With an aspect of the present invention, the turbine rotor can be cooled in a greater degree.

BRIEF DESCRIPTION OF THE DRAWINGS

FIG. 3A is a cross-sectional view of the rotor disc, and FIG. 3B is an arrow B view of FIG. 3A.

DESCRIPTION OF THE PREFERRED EMBODIMENTS

An embodiment and various modified examples of gas turbine equipment according to the present invention are described in detail below with reference to the drawings.

Embodiment

An embodiment of the gas turbine equipment according to the present invention is described with reference to FIG. 1 through FIG. 7.

Figure 1:
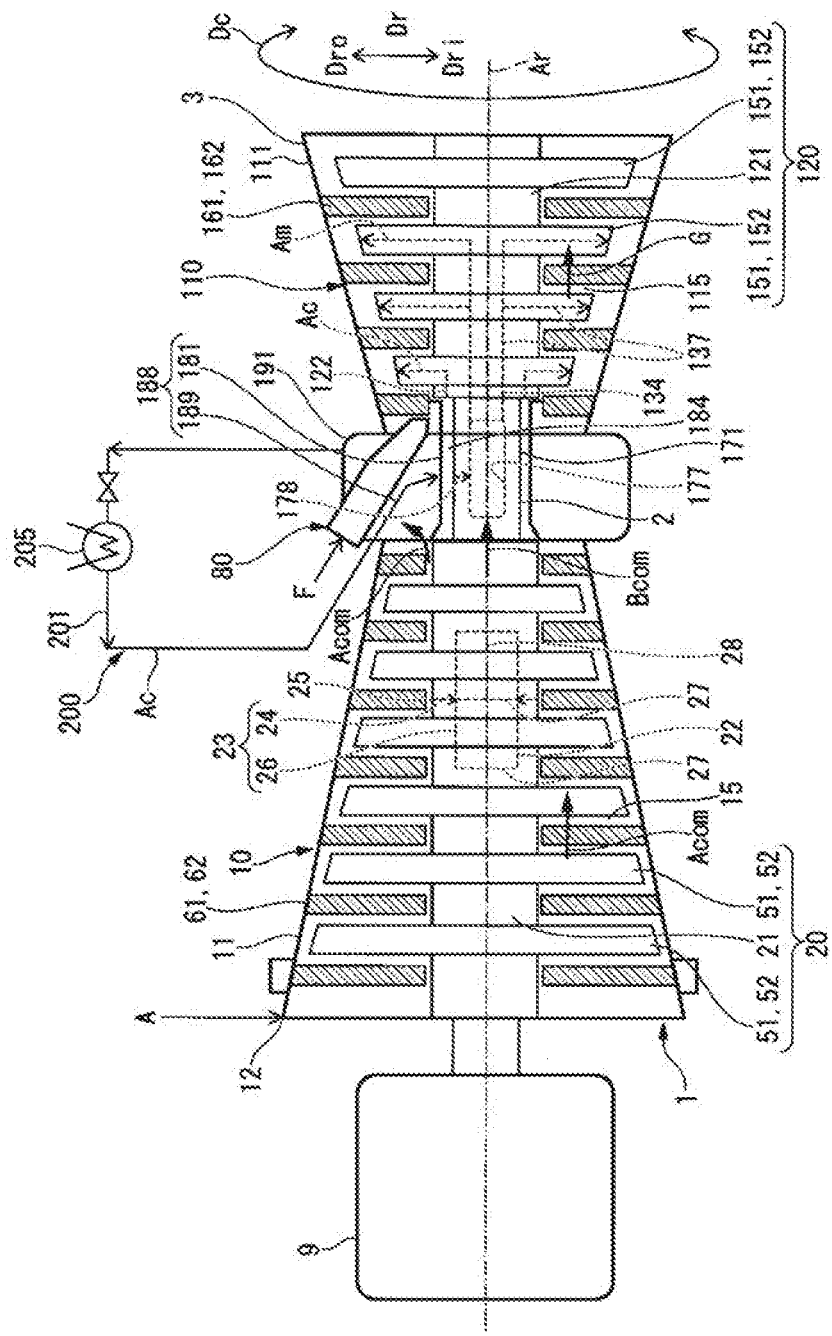
FIG. 1 is a schematic cross-sectional view of gas turbine equipment in an embodiment according to the present invention.

As illustrated in FIG. 1, the gas turbine equipment according to the present embodiment is provided with a gas turbine 1, and a cooling system 200 for generating cooling air.

The gas turbine 1 is provided with a compressor 10 for generating compressed air Acom by compressing outside air A, a combustor 80 for generating a combustion gas by burning a fuel F from a fuel supply source in the compressed air Acom, and a turbine 110 driven by the combustion gas.

The compressor 10 has a compressor rotor 20 that rotates around an axial line Ar and a cylindrical compressor casing 11 covering the compressor rotor 20. Note that a direction in which the axial line Ar is extending is referred to hereinafter as axial direction Da. Furthermore, one side in the axial direction Da is referred to as axially upstream side Dau, and the other side in the axial direction Da is referred to as axially downstream side Dad. A radial direction based on the axial line Ar is referred to simply as radial direction Dr. Moreover, a far side from the axial line Ar in the radial direction Dr is referred to as radially outer side Dro, and a side close to the axial line Ar in the radial direction Dr is referred to as radially inner side Dri.

The compressor 10 is an axial flow compressor. Therefore, the compressor rotor 20 has a compressor rotor shaft 21 extending in the axial direction Da centered on the axial line Ar, and a plurality of blade rows 51 aligned in the axial direction Da and secured to an outer circumference of the compressor rotor shaft 21. An end on the axially upstream side Dau of the compressor casing 11 is open, and this opening forms an air intake port 12. A vane row 61 is secured to a position on the axially downstream side Dad of each blade row 51 on an inner circumferential side of the compressor casing 11. Each vane row 61 has a plurality of vanes 62. The plurality of vanes 62 are aligned in a circumferential direction Dc centered on the axial line Ar, and form one of the vane rows 61. Furthermore, each blade row 51 has a plurality of blades 52. The plurality of blades 52 are aligned in the circumferential direction Dc centered on the axial line Ar, and form one of the blade rows 51.

The turbine 110 is provided on the axially downstream side Dad of the compressor 10. The turbine 110 has a turbine rotor 120 that rotates around the axial line Ar and a cylindrical turbine casing 111 covering the turbine rotor 120. The turbine rotor 120 has a turbine rotor shaft 121 extending in the axial direction Da centered on the axial line Ar, and a plurality of blade rows 151 aligned in the axial direction Da and secured to an outer circumference of the turbine rotor shaft 121. A vane row 161 is secured to a position on an upstream side of each blade row 151 on an inner circumferential side of the turbine casing 111. Each vane row 161 has a plurality of vanes 162. The plurality of vanes 162 are aligned in the circumferential direction Dc centered on the axial line Ar, and form one of the vane rows 161. Furthermore, each blade row 151 has a plurality of blades 152. The plurality of blades 152 are aligned in the circumferential direction De centered on the axial line Ar, and form one of the blade rows 151.

The gas turbine 1 according to the present embodiment is also provided with an intermediate rotor shaft 171, an intermediate rotor shaft cover 181, a cooling air pipe 189, and an intermediate casing 191. The intermediate rotor shaft 171 connects the compressor rotor 20 and the turbine rotor 120 to each other. Therefore, the intermediate rotor shaft 171 is positioned between the compressor rotor 20 and the turbine rotor 120 in the axial direction Da. The compressor rotor 20, intermediate rotor shaft 171, and turbine rotor 120 are positioned on the same axial line Ar, and rotate together around said axial line Ar. These configure a gas turbine rotor 2. A rotor of, for example, a generator 9 is connected to the gas turbine rotor 2. The intermediate casing 191 covers an outer circumferential side of the intermediate rotor shaft 171. Therefore, the intermediate casing 191 is positioned between the compressor casing 11 and the turbine casing 111 in the axial direction Da. The compressor casing 11, intermediate casing 191, and turbine casing 111 are connected together to configure a gas turbine casing 3. The combustor 80 is attached to the intermediate casing 191. The compressed air Acom from the compressor 10 flows into the intermediate casing 191. The compressed air Acom flows into the combustor 80 from the intermediate casing 191. The intermediate rotor shaft cover 181 is positioned on the radially inner side Dri of the gas turbine casing 3 and covers the radially outer side Dro of the intermediate rotor shaft 171. The intermediate rotor shaft cover 181 is secured to the gas turbine casing 3. A first end of the cooling air pipe 189 is secured to the intermediate casing 191, and a second end of the cooling air pipe 189 is secured to the intermediate rotor shaft cover 181.

The cooling system 200 is provided with a cooling air line 201 and a cooler 205. The cooling air line 201 is provided on an outside of the gas turbine casing 3. A first end of the cooling air line 201 is connected to the intermediate casing 191, and a second end of the cooling air line 201 is connected to the cooling air pipe 189 of the gas turbine 1. The compressed air Acom inside the intermediate casing 191 flows into the cooling air line 201 from the first end of the cooling air line 201. The cooler 205 is provided on the cooling air line 201. The cooler 205 cools the compressed air Acom that has flowed into the cooling air line 201 to thus create cooling air Ac from the compressed air Acom. For example, the cooler 205 is a heat exchanger that causes heat exchange to occur between the compressed air Acom in the cooling air line 201 and a cooling medium, and thus cools the compressed air Acom. Note that the cooler 205 may be configured with a radiator through the interior of which the compressed air Acom flows and a fan for blowing air on the exterior of the radiator. The cooling air Ac generated by the cooler 205 flows into the cooling air pipe 189 through the cooling air line 201.

Figure 2:
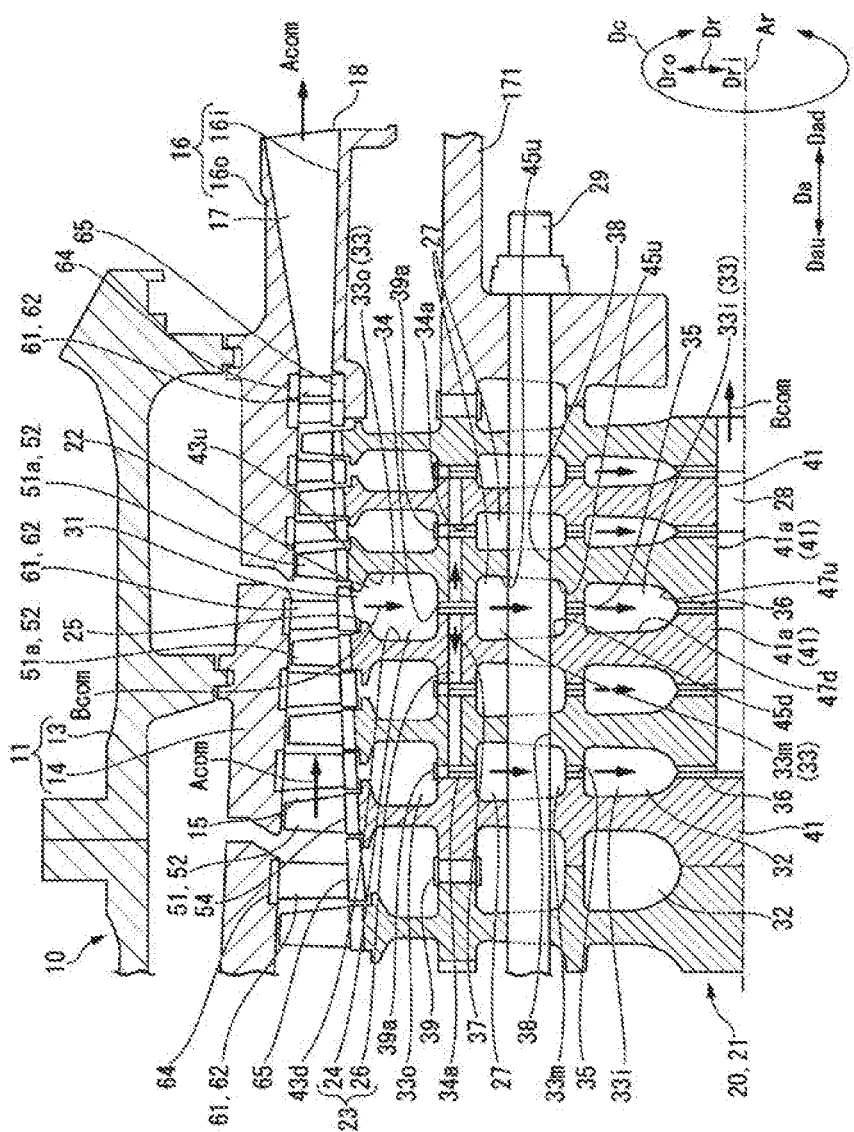
FIG. 2 is a cross-sectional view of main components of a compressor in the embodiment according to the present invention.
Figure 3:
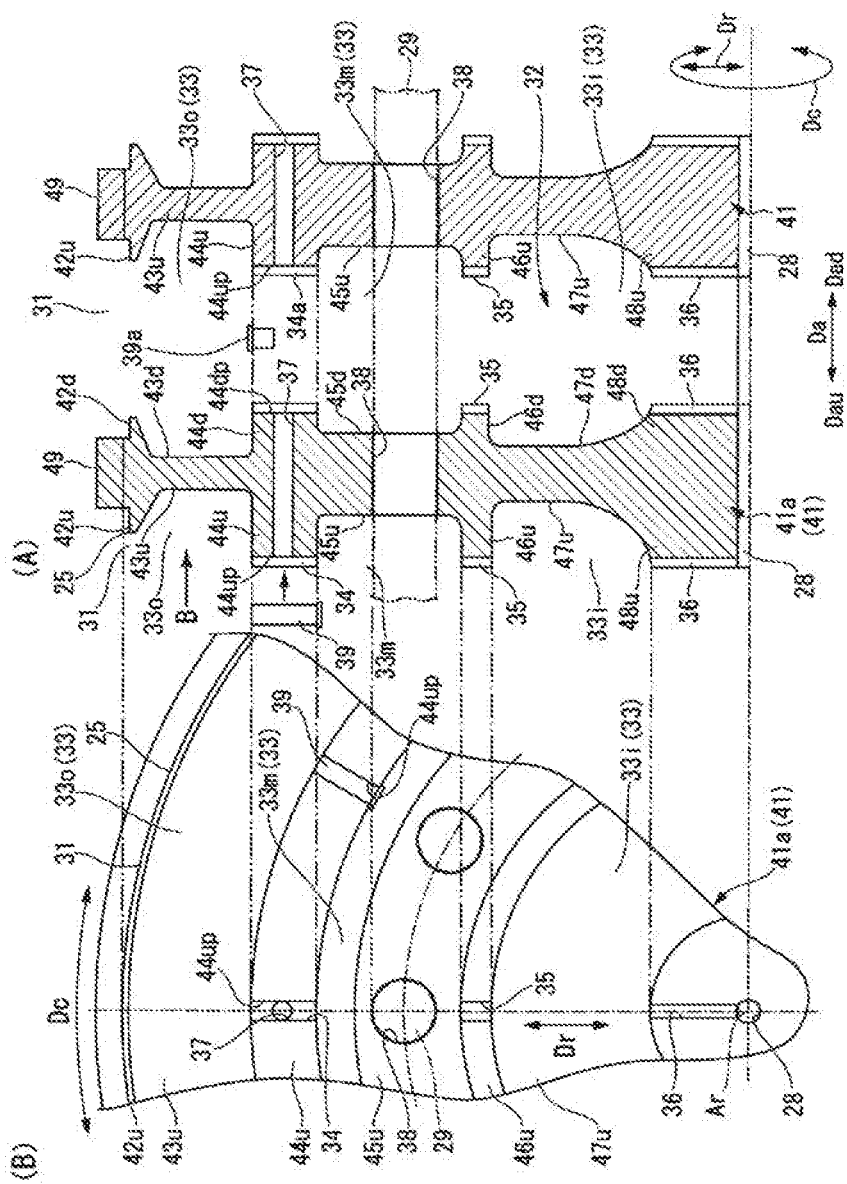
FIGS. 3A and 3B illustrate a rotor disc of the compressor in the embodiment according to the present invention, where

As illustrated in FIG. 2, the compressor casing 11 has a compressor casing main body 13 and a vane retaining ring 14 provided inside the compressor casing main body 13. The vane retaining ring 14 forms a ring shape centered on the axial line Ar. The vane retaining ring 14 is secured to the compressor casing main body 13. The plurality of vanes 62 are secured to the vane retaining ring 14.

Figure 4:
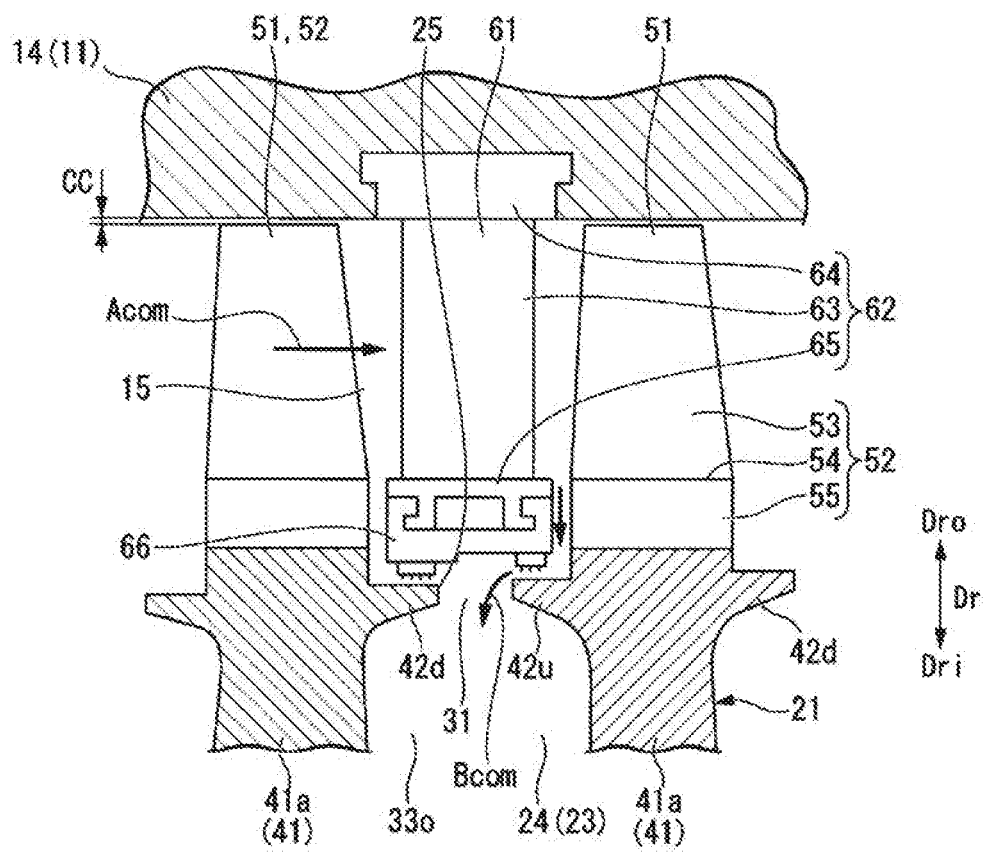
FIG. 4 is a cross-sectional view of main components around a blade and a vane of the compressor in the embodiment according to the present invention.

As illustrated in FIG. 4, the vane 62 has a vane body 63 extending in the radial direction Dr, an outer shroud 64 provided on the radially outer side Dro of the vane body 63, and an inner shroud 65 provided on the radially inner side Dri of the vane body 63. The outer shroud 64 is attached on the radially inner side Dri of the vane retaining ring 14. A seal ring 66 is provided on the inner shroud 65 on the radially inner side Dri thereof. The blade 52 has a blade body 53 extending in the radial direction Dr, a platform 54 provided on the radially inner side Dri of the blade body 53, and a blade root 55 provided on the radially inner side Dri of the platform 54. The blade root 55 is embedded in the compressor rotor shaft 21.

As illustrated in FIG. 2, an air compression flow path 15 through which air in a compression process passes forms a ring shape centered on the axial line Ar in the compressor 10. An outer circumferential side of the air compression flow path 15 is defined by the compressor casing 11 and the outer shrouds 64 of the vanes 62. Furthermore, an inner circumferential side of the air compression flow path 15 is defined by the platforms 54 of the blades 52 and the inner shrouds 65 of the vanes 62.

A diffuser 16 is provided on the axially downstream side Dad of the vane row 61 that is farthest on the axially downstream side Dad of the plurality of vane rows 61. The diffuser 16 has a ring-shaped outer diffuser 16o and a ring-shaped inner diffuser 16i provided on the radially inner side Dri of the outer diffuser 16o. The outer diffuser 16o extends, and an inner diameter thereof becomes gradually larger, toward the axially downstream side Dad from the outer shrouds 64 of the plurality of vanes 62 that configure the vane row 61 farthest on the axially downstream side Dad. Meanwhile, the inner diffuser 16i extends, and an outer diameter thereof becomes gradually smaller, toward the axially downstream side Dad from the inner shrouds 65 of the plurality of vanes 62 that configure the vane row 61 farthest on the axially downstream side Dad. A ring-shaped space between the ring-shaped outer diffuser 16o and the ring-shaped inner diffuser 16i forms an air discharge flow path 17 linked to the ring-shaped air compression flow path 15. An end on the axially downstream side Dad of the air discharge flow path 17 opens into the intermediate casing 191. This opening forms an air discharge port 18 in the compressor 10.

The rotation of the compressor rotor 20 causes the outside air A to flow into the air compression flow path 15 from the air intake port 12 (see FIG. 1), where the air flows to the axially downstream side Dad from the axially upstream side Dau while being compressed inside the air compression flow path 15. The compressed air Acom, which is the air compressed inside the air compression flow path 15, flows into the air discharge flow path 17. The compressed air Acom flows into the intermediate casing 191 from the air discharge port 18.

A plurality of cavities 33 are formed separated from one another in the radial direction Dr in the compressor rotor shaft 21, forming ring shapes centered on the axial line Ar in each position in the axial direction Da between each of the plurality of blade rows 51, that is, in each position in the axial direction Da of the plurality of vane rows 61. A plurality of cavities 33 formed in a position in the axial direction Da between a pair of blade rows 51 adjacent in the axial direction Da configure one cavity group 32. Therefore, a plurality of the cavity groups 32 are formed along the axial direction Da in the compressor rotor shaft 21.

Each of the cavity groups 32 is configured of three of the cavities 33: an outer cavity 33o formed farthest on the radially outer side Dro in the compressor rotor shaft 21, an intermediate cavity 33m formed farther on the radially inner side Dri than the outer cavity 33o, and an inner cavity 33i formed farthest on the radially inner side Dri inside the compressor rotor shaft 21.

Further, a radially outer flow path 31 linking the outer cavity 33o and the air compression flow path 15 is formed in the compressor rotor shaft 21.

The compressor rotor shaft 21 has a plurality of rotor discs 41 stacked in the axial direction Da, a spindle bolt 29 penetrating the plurality of rotor discs 41 and a plurality of the intermediate cavities 33m in the axial direction Da, and a cylindrical torque pin 39 for regulating relative rotation between adjacent rotor discs 41.

One of the blade rows 51 is attached to one of the rotor discs 41. Therefore, there is one rotor disc 41 for each of the plurality of blade rows 51.

As illustrated in FIGS. 3A and 3B, a plurality of cavities 33 configuring one of the cavity groups 32, and the radially outer flow path 31, are both formed between two of the rotor discs 41 adjacent in the axial direction Da. Note that FIG. 3A is a cross-sectional view of the rotor disc 41, and FIG. 3B is an arrow B view of FIG. 3A.

A blade attachment part 49 for attaching the blade roots 55 of the plurality of blades 52 configuring one of the blade rows 51 is formed on the radially outer side Dro of each of the rotor discs 41.

An upstream first concave part 43u, an upstream second concave part 45u, and an upstream third concave part 47u are formed in each of the rotor discs 41. In order to form the outer cavity 33o on the axially upstream side Dau of the rotor disc 41, the upstream first concave part 43u is recessed toward the axially downstream side Dad from part on the axially upstream side Dau in the rotor disc 41. In order to form the intermediate cavity 33m on the axially upstream side Dau of the rotor disc 41, the upstream second concave part 45u is recessed toward the axially downstream side Dad from part on the axially upstream side Dau in the rotor disc 41 in a position farther on the radially inner side Dri than the upstream first concave part 43u. In order to form the inner cavity 33i on the axially upstream side Dau of the rotor disc 41, the upstream third concave part 47u is recessed toward the axially downstream side Dad from part on the axially upstream side Dau in the rotor disc 41 in a position farther on the radially inner side Dri than the upstream second concave part 45u. Therefore, a ring-shaped upstream first arm part 42u protruding toward the axially upstream side Dau relative to a bottom surface of the upstream first concave part 43u is formed on the radially outer side Dro of the upstream first concave part 43u. Furthermore, a ring-shaped upstream second arm part 44u protruding toward the axially upstream side Dau relative to the bottom surface of the upstream first concave part 43u and a bottom surface of the upstream second concave part 45u is formed between the upstream first concave part 43u and the upstream second concave part 45u. Additionally, a ring-shaped upstream third arm part 46u protruding toward the axially upstream side Dau relative to the bottom surface of the upstream second concave part 45u and a bottom surface of the upstream third concave part 47u is formed between the upstream second concave part 45u and the upstream third concave part 47u. Moreover, a ring-shaped upstream protruding part 48u protruding toward the axially upstream side Dau relative to the bottom surface of the upstream third concave part 47u is formed on the radially inner side Dri of the upstream third concave part 47u.

A plurality of upstream pin grooves 44up recessed toward the axially downstream side Dad for linking the upstream first concave part 43u and the upstream second concave part 45u are formed in the ring-shaped upstream second arm part 44u. The plurality of upstream pin grooves 44up are aligned in the circumferential direction Dc.

Furthermore, a downstream first concave part 43d, a downstream second concave part 45d, and a downstream third concave part 47d are formed in each of the rotor discs 41. In order to form the outer cavity 33o on the axially downstream side Dad of the rotor disc 41, the downstream first concave part 43d is recessed toward the axially upstream side Dau from part on the axially downstream side Dad in the rotor disc 41. In order to form the intermediate cavity 33m on the axially downstream side Dad of the rotor disc 41, the downstream second concave part 45d is recessed toward the axially upstream side Dau from part on the axially downstream side Dad in the rotor disc 41 in a position farther on the radially inner side Dri than the downstream first concave part 43d. In order to form the inner cavity 33i on the axially downstream side Dad of the rotor disc 41, the downstream third concave part 47d is recessed toward the axially upstream side Dau from part on the axially downstream side Dad in the rotor disc 41 in a position farther on the radially inner side Dri than the downstream second concave part 45d. Therefore, a ring-shaped downstream first arm part 42d protruding toward the axially downstream side Dad relative to a bottom surface of the downstream first concave part 43d is formed on the radially outer side Dro of the downstream first concave part 43d. Furthermore, a ring-shaped downstream second arm part 44d protruding toward the axially downstream side Dad relative to the bottom surface of the downstream first concave part 43d and a bottom surface of the downstream second concave part 45d is formed between the downstream first concave part 43d and the downstream second concave part 45d. Furthermore, a ring-shaped downstream third arm part 46d protruding toward the axially downstream side Dad relative to the bottom surface of the downstream second concave part 45d and a bottom surface of the downstream third concave part 47d is formed between the downstream second concave part 45d and the downstream third concave part 47d. Moreover, a ring-shaped downstream protruding part 48d protruding toward the axially downstream side Dad relative to the bottom surface of the downstream third concave part 47*d* is formed on the radially inner side Dri of the downstream third concave part 47*d*.

A plurality of downstream pin grooves 44*dp* recessed toward the axially upstream side Dau for linking the downstream first concave part 43*d* and the downstream second concave part 45*d* are formed in the ring-shaped downstream second arm part 44*d*. The plurality of downstream pin grooves 44*dp* are aligned in the circumferential direction Dc.

The outer cavity 33*o* is defined by the downstream first concave part 43*d* in the rotor disc 41 on the axially upstream side Dau of the two rotor discs 41 adjacent in the axial direction Da, and the upstream first concave part 43*u* in the rotor disc 41 on the axially downstream side Dad. The intermediate cavity 33*m* is defined by the downstream second concave part 45*d* in the rotor disc 41 on the axially upstream side Dau of the two rotor discs 41 adjacent in the axial direction Da, and the upstream second concave part 45*u* in the rotor disc 41 on the axially downstream side Dad. The inner cavity 33*i* is defined by the downstream third concave part 47*d* in the rotor disc 41 on the axially upstream side Dau of the two rotor discs 41 adjacent in the axial direction Da, and the upstream third concave part 47*u* in the rotor disc 41 on the axially downstream side Dad.

The downstream first arm part 42*d* in the rotor disc 41 on the axially upstream side Dau of the two rotor discs 41 adjacent in the axial direction Da, and the upstream first arm part 42*u* in the rotor disc 41 on the axially, downstream side Dad face each other and are separated from each other in the axial direction Da. The radially outer flow path 31 is defined by the downstream first arm part 42*d* in the rotor disc 41 on the axially upstream side Dau of the two rotor discs 41 adjacent in the axial direction Da, and the upstream first arm part 42*u* in the rotor disc 41 on the axially downstream side Dad.

The plurality of downstream pin grooves 44*dp* in the rotor disc 41 on the axially upstream side Dau of the two rotor discs 41 adjacent in the axial direction Da, and the plurality of upstream pin grooves 44*up* in the rotor disc 41 on the axially downstream side Dad face each other in the axial direction Da. The pin hole in which the torque pin 39 is mounted is defined by the downstream pin groove 44*dp* and the upstream pin groove 44*up*. The pin hole in which the torque pin 39 is mounted is made cylindrical to correspond to the shape of the cylindrical torque pin 39.

A bolt through hole 38 into which the spindle bolt 29 is inserted is formed in the rotor disc 41 so as to penetrate from the bottom surface of the upstream second concave part 45*u* to the bottom surface of the downstream second concave part 45*d*.

Further, a ventilation flow path 22 for guiding air flowing between two of the blade rows 51 of the plurality of blade rows 51, adjacent in the axial direction Da to an interior of the compressor rotor shaft 21 is formed in the compressor rotor shaft 21, as illustrated in FIG. 1 and FIG. 2. Here, the two blade rows 51 of the plurality of blade rows 51 adjacent in the axial direction Da are two blade rows 51 between the blade row 51 farthest on the axially downstream side Dad and the blade row 51 farthest on the axially upstream side Dau. Thus, these two blade rows 51 are hereinafter referred to as intermediate blade row 51*a*. Furthermore, the rotor disc 41 to which the intermediate blade row 51*a* is attached is referred to as intermediate rotor disc 41*a*. Note that the rotor disc 41 on the axially upstream side Dau (left side in FIG. 3A) illustrated in FIG. 3A is the intermediate rotor disc 41*a* of the two intermediate rotor discs 41*a* that is on the axially downstream side Dad. Furthermore, the rotor disc 41 on the axially downstream side Dad (right side in FIG. 3A) illus-trated in FIG. 3A is a rotor disc 41 adjoining the axially downstream side Dad of the intermediate rotor disc 41*a* that is on the axially downstream side Dad.

The ventilation flow path 22 has an introduction part 23, a plurality of branch parts 27, and a collection part 28. The introduction part 23 has an inflow part 24 and a distribution part 26. An inflow port 25 into which the compressed air Acom flowing between the two intermediate blade rows 51*a* flows as compressor extracted air Bcom is formed in the inflow part 24. The inflow part 24 extends toward the radially inner side Dri from the inflow port 25. The distribution part 26 extends toward the axially upstream side Dau and the axially downstream side Dad from the inflow part 24. The plurality of branch parts 27 branch out from the distribution part 26 of the introduction part 23, and are formed in mutually different positions in the axial direction Da. Flow paths of the plurality of branch parts 27 extend in the radial direction Dr. The collection part 28 is connected to each end of the plurality of branch parts 27 on the radially inner side Dri. The collection part 28 extends in the axial direction Da. Air flows into the collection part 28 after passing through the plurality of branch parts 27, and air that has flowed in is caused to flow outside.

As illustrated in FIG. 2 and FIGS. 3A and 3B, the inflow port 25 of the inflow part 24 is formed by an opening on the radially outer side Dro of the radially outer flow path 31 formed between the two intermediate rotor discs 41*a*. A through hole 37 penetrating in the axial direction Da is formed in the two intermediate rotor discs 41*a*. The through hole 37 linking to the through hole 37 of the intermediate rotor disc 41*a* is also formed in one or a plurality of the rotor discs 41 farther on the axially upstream side Dau than the intermediate rotor disc 41*a*, of the two intermediate rotor discs 41*a*, that is on the axially upstream side Dau. Furthermore, the through hole 37 linking to the through hole 37 of the intermediate rotor disc 41*a* is also formed in one or a plurality of the rotor discs 41 farther on the axially downstream side Dad than the intermediate rotor disc 41*a*, of the two intermediate rotor discs 41*a*, that is on the axially downstream side Dad. All of these through holes 37 penetrate from a groove bottom of the upstream pin groove 44*up* of the rotor disc to a groove bottom of the downstream pin groove 44*dp*.

The torque pin 39 is not provided in one or more of the pin holes of the plurality of pin holes formed by the plurality of downstream pin grooves 44*dp* in the intermediate rotor disc 41*a* on the axially upstream side Dau of the two intermediate rotor discs 41*a*, and the plurality of upstream pin grooves 44*up* in the intermediate rotor disc 41*a* on the axially downstream side Dad. Therefore, the pin hole forms a first intermediate flow path 34 linking the outer cavity 33*o* and the intermediate cavity 33*m* formed between the two intermediate rotor discs 41*a*. The through holes 37 formed in the two intermediate rotor discs 41*a* are linked to the first intermediate flow path 34. Note that while the pin hole is used as the first intermediate flow path 34 here, a separate hole may be formed in addition to the pin hole, and this hole may be used as the first intermediate flow path 34.

A torque pin 39*a* is provided in at least one of the pin holes out of the plurality of pin holes formed between the intermediate rotor disc 41*a* on the axially upstream side Dau and one or a plurality of the rotor discs 41 farther on the axially upstream side Dau than the intermediate rotor disc 41*a*, extending toward the radially outer side Dro from an intermediate position in the radial direction Dr of said pin holes. Therefore, an opening on the radially outer side Dro of the pin hole is blocked by the torque pin 39*a*, while, on the other hand, an opening on the radially inner side Dri of the pin hole is not blocked by the torque pin 39a. In the pin hole, a part on the radially outer side Dro forms a second intermediate flow path 34a that links to the intermediate cavity 33m.

Furthermore, the torque pin 39a is provided in at least one of the pin holes out of the plurality of pin holes formed between the intermediate rotor disc 41a on the axially downstream side Dad and one or a plurality of the rotor discs 41 farther on the axially downstream side Dad than the intermediate rotor disc 41a, extending toward the radially outer side Dro from an intermediate position in the radial direction Dr of said pin holes. Therefore, an opening on the radially outer side Dro of the pin hole is blocked by the torque pin 39a, while, on the other hand, an opening on the radially inner side Dri of the pin hole is not blocked by the torque pin 39a. A part on the radially outer side Dro in this pin hole also forms a second intermediate flow path 34a that links to the intermediate cavity 33m. Note that while part of the pin hole is used as the second intermediate flow path 34a here, a separate hole may be formed in addition to the pin hole, and this hole may be used as the second intermediate flow path 34a.

The through holes 37 formed in the rotor discs 41 including the intermediate rotor discs 41a are linked to the second intermediate flow path 34a.

The inflow part 24 of the ventilation flow path 22 is formed by the radially outer flow path 31, the outer cavity 33o, and a part on the radially outer side Dro of the first intermediate flow path 34, all formed between the two intermediate rotor discs 41a. The distribution part 26 of the ventilation flow path 22 is formed by the through holes 37 formed in the rotor discs 41 including the intermediate rotor discs 41a.

A through hole penetrating in the axial direction Da is formed in the rotor disc 41 that, out of the plurality of rotor discs 41 in which the through hole 37 is formed, is farthest on the axially upstream side Dau, and in all of the rotor discs 41 farther on the axially downstream side Dad than this rotor disc 41, in a position farther on the radially inner side Dri than the inner cavity 33i. The collection part 28 of the ventilation flow path 22 is formed by this hole.

A first inner flow path 35 linking the intermediate cavity 33m and the inner cavity 33i and a second inner flow path 36 linking the inner cavity 33i and the collection part 28 are formed between each of the rotor discs 41, including the intermediate rotor discs 41a. One branch part 27 of the plurality of branch parts 27 in the ventilation flow path 22 is formed by a part on the radially inner side Dri of the first intermediate flow path 34, the intermediate cavity 33m linked to the first intermediate flow path 34, the first inner flow path 35 linked to the intermediate cavity 33m, the inner cavity 33i linked to the first inner flow path 35, and the second inner flow path 36 linked to the inner cavity 33i. Furthermore, another branch part 27 of the plurality of branch parts 27 in the ventilation flow path 22 is formed by the second intermediate flow path 34a, the intermediate cavity 33m linked to the second intermediate flow path 34a, the first inner flow path 35 linked to the intermediate cavity 33m, the inner cavity 33i linked to the first inner flow path 35, and the second inner flow path 36 linked to the inner cavity 33i.

Figure 5:
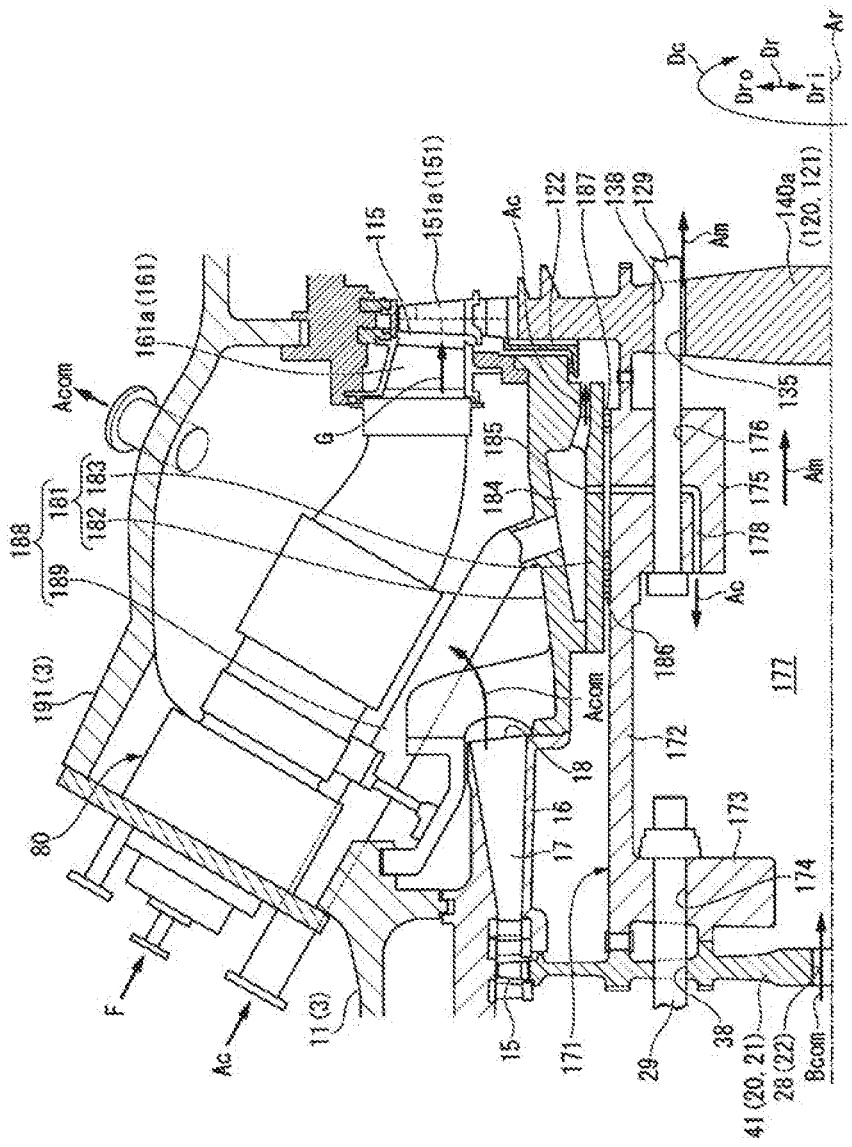
FIG. 5 is a cross-sectional view around a combustor of the gas turbine in the embodiment according to the present invention.

As illustrated in FIG. 5, the intermediate rotor shaft 171 has a cylindrical part 172 having a cylindrical shape centered on the axial line, an upstream flange part 173 protruding toward the radially inner side Dri from a part on the axially upstream side Dau of the cylindrical part 172, and a downstream flange part 175 protruding toward the radially inner side Dri from a part on the axially downstream side Dad of the cylindrical part 172. There is a hollow on the radially inner side Dri of the cylindrical part 172, upstream flange part 173, and downstream flange part 175. This hollow part forms a mixing space 177. A bolt through hole 174 into which the spindle bolt 29 of the compressor 10 is inserted is formed in the upstream flange part 173. The intermediate rotor shaft 171 and the compressor rotor shaft 21 are linked by the spindle bolt 29. A bolt through hole 176 into which a spindle bolt 129 of the turbine 110 to be described later is inserted is formed in the downstream flange part 175. The intermediate rotor shaft 171 and the turbine rotor shaft 121 are linked by the spindle bolt 129.

A first cooling air flow path 178 penetrating to the mixing space 177 through the downstream flange part 175 from the radially outer side Dro of the intermediate rotor shaft 171 is formed in the intermediate rotor shaft 171.

The intermediate rotor shaft cover 181 is provided in the intermediate casing 191. The intermediate rotor shaft cover 181 has a cylindrical inner cover 183 covering the radially outer side Dro of the intermediate rotor shaft 171, and a cylindrical outer cover 182 covering the radially outer side Dro of the inner cover 183. An end on the axially upstream side Dau of the outer cover 182 is secured to the gas turbine casing 3 through the diffuser 16 of the compressor 10. Furthermore, an end on the axially downstream side Dad of the outer cover 182 is secured to the gas turbine casing 3 through a first vane row 161a farthest on the axially upstream side out of the plurality of vane rows 161 of the turbine 110. The inner cover 183 covers an area located on the radially outer side Dro of the intermediate rotor shaft 171 and including an opening of the first cooling air flow path 178 in the outer circumferential surface of the intermediate rotor shaft 171. An end on the axially upstream side Dau of the inner cover 183 is connected to the inner circumferential surface of the outer cover 182. All parts of the inner cover 183 farther on the axially downstream side Dad than the end thereof on the axially upstream side Dau are separated toward the radially inner side Dri from the inner circumferential surface of the outer cover 182. A space between the inner circumferential surface of the outer cover and the outer circumferential surface of the inner cover forms an air introduction space 184. The cooling air pipe 189 is connected to the outer cover 182. A through hole 185 penetrating from the radially outer side Dro to the radially inner side Dri is provided in the inner cover 183 in a position that is substantially the same as the opening of the first cooling air flow path 178 of the intermediate rotor shaft 171 in the axial direction Da. Furthermore, an upstream seal 186 and a downstream seal 187 for sealing a space between the intermediate rotor shaft 171 and the inner cover 183 are provided in the inner circumferential surface of the inner cover 183. The upstream seal 186 is provided farther on the axially upstream side Dau than the through hole 185 of the inner cover 183. The downstream seal 187 is provided farther on the axially downstream side Dad than the through hole 185 of the inner cover 183.

A cooling air introduction member 188 for guiding the cooling air Ac from the cooling system 200 to the gas turbine rotor 2 is configured having the cooling air pipe 189 and the intermediate rotor shaft cover 181.

The collection part 28 of the ventilation flow path 22 formed in the compressor rotor shaft 21 is linked to the mixing space 177. Therefore, the compressor extracted air Bcom flows into the mixing space 177 after passing through the ventilation flow path 22 of the compressor rotor shaft 21.

Furthermore, the cooling air Ac from the cooling air pipe 189 flows into the air introduction space 184 of the intermediate rotor shaft cover 181. The cooling air Ac in the air introduction space 184 flows into the mixing space 177 of the intermediate rotor shaft 171 through the through hole 185 of the inner cover 183 and the first cooling air flow path 178 of the intermediate rotor shaft 171. Therefore, the cooling air Ac from the cooling system 200 and the compressor extracted air Bcom from the compressor rotor shaft 21 are mixed in the mixing space 177.

Figure 6:
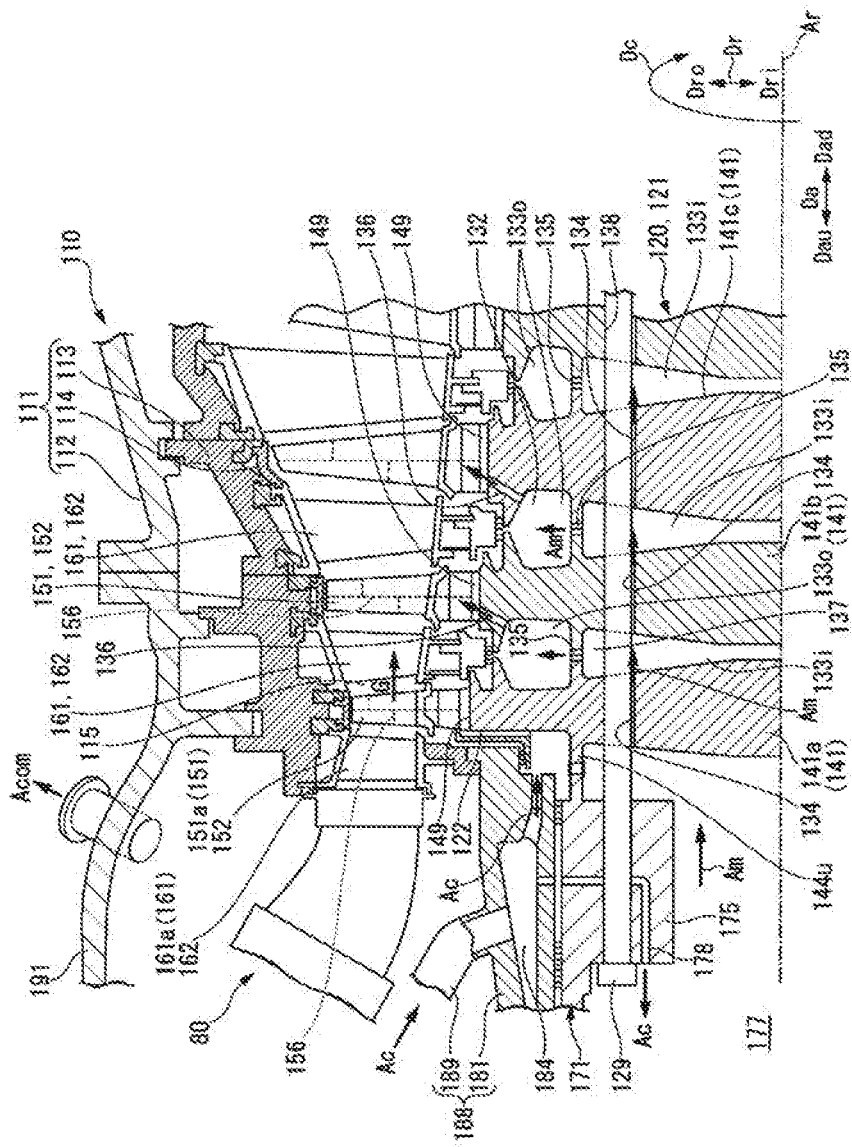
FIG. 6 is a cross-sectional view of main components of a turbine in the embodiment according to the present invention.

As illustrated in FIG. 6, the turbine casing 111 has a turbine casing body 112, a blade ring 113 provided in the turbine casing body 112, and a ring segment 114 provided on the radially inner side Dri of the blade ring 113. The blade ring 113 is secured on the radially inner side Dri of the turbine casing body 112. The ring segment 114 is provided in a position on the radially outer side Dro of the blade row 151 of the turbine 110. The plurality of vanes 162 and the plurality of ring segments 114 are secured on the radially inner side Dri of the blade ring 113.

Figure 7:
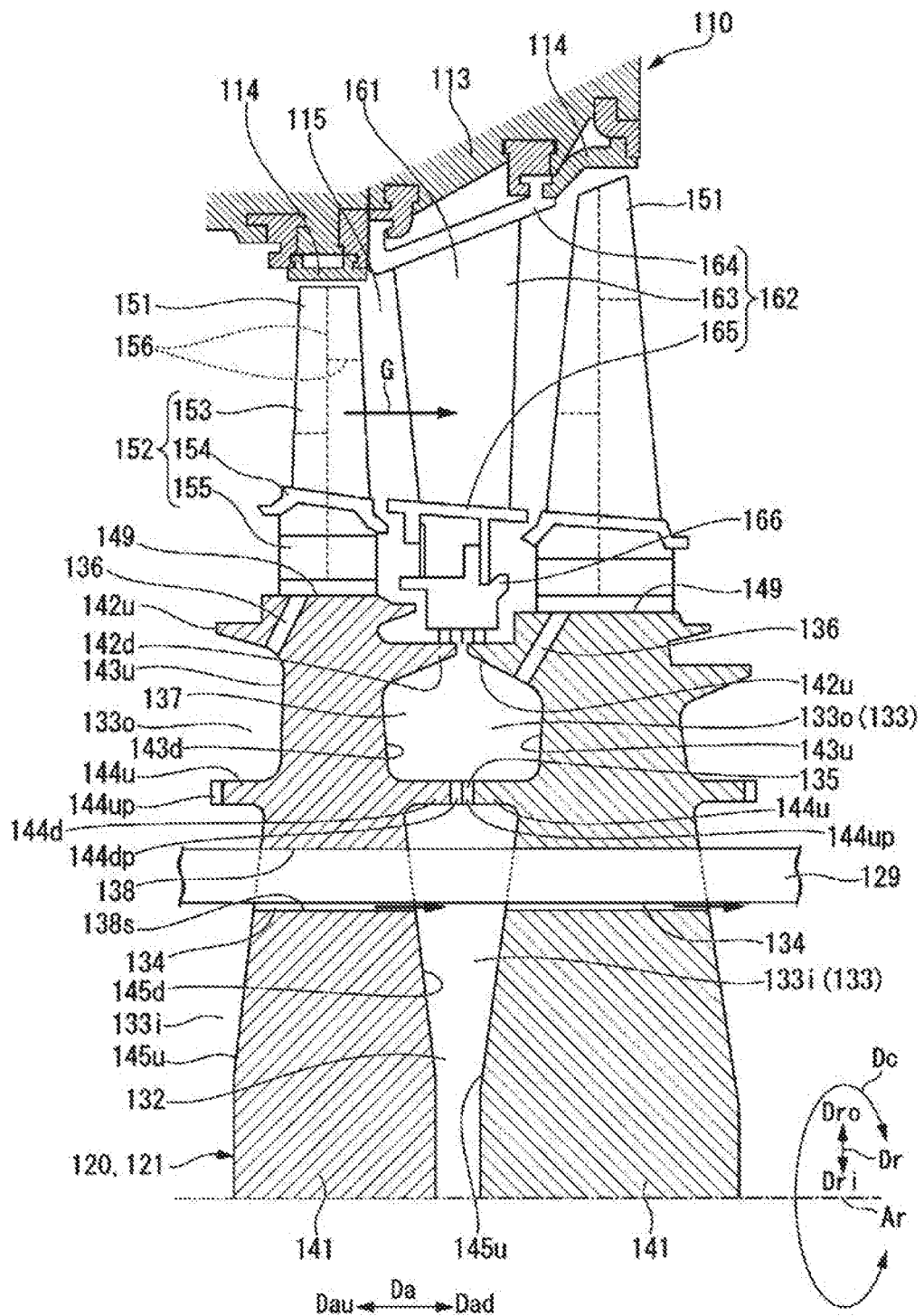
FIG. 7 is a cross-sectional view of main components around a blade and a vane of the turbine in the embodiment according to the present invention.

As illustrated in FIG. 7, the vane 162 of the turbine 110 has a vane body 163 extending in the radial direction Dr, an outer shroud 164 provided on the radially outer side Dro of the vane body 163, and an inner shroud 165 provided on the radially inner side Dri of the vane body 163. The outer shroud 164 is attached on the radially inner side Dri of the blade ring 113. A seal ring 166 is provided on the inner shroud 165 on the radially inner side Dri thereof. The blade 152 of the turbine 110 has a blade body 153 extending in the radial direction Dr, a platform 154 provided on the radially inner side Dri of the blade body 153, and a blade root 155 provided on the radially inner side Dri of the platform 154. The blade root 155 is embedded in the turbine rotor shaft 121. An air flow path 156 is formed in the blade 152. The air flow path 156 is open in an outer surface of the blade root 155, and extends through the blade root 155 and the platform 154 to the blade body 153.

A combustion gas flow path 115 through which a combustion gas G flows from the combustor 80 in the turbine 110 forms a cylindrical shape centered on the axial line Ar. An outer circumferential side of the combustion gas flow path 115 is defined by the ring segments 114 and the outer shrouds 164 of the vanes 162. Furthermore, the inner circumferential side of the combustion gas flow path 115 is defined by the platforms 154 of the blades 152 and the inner shrouds 165 of the vanes 162.

A plurality of cavities 133 are formed separated from one another in the radial direction Dr in the turbine rotor shaft 121, forming ring shapes centered on the axial line Ar in each position in the axial direction Da between each of the plurality of blade rows 151, that is, in each position in the axial direction Da of the plurality of vane rows 161. A plurality of cavities 133 formed in a position in the axial direction Da between a pair of blade rows 151 adjacent in the axial direction Da configure one cavity group 132. Therefore, a plurality of the cavity groups 132 are formed along the axial direction Da in the turbine rotor shaft 121.

Each of the cavity groups 132 is configured of two of the cavities 133: an outer cavity 133o formed farthest on the radially outer side Dro in the turbine rotor shaft 121; and an inner cavity 133i formed farther on the radially inner side Dri than the outer cavity 133o.

The turbine rotor shaft 121 has a plurality of rotor discs 141 stacked in the axial direction Da, and a spindle bolt 129 penetrating the plurality of rotor discs 141 and inner cavities 133i in the axial direction Da. A gear coupling (not illustrated in the drawings) for regulating relative rotation between rotor discs 141 adjacent in the axial direction Da is formed for each of the plurality of rotor discs 141.

One of the blade rows 151 is attached to one of the rotor discs 141. Therefore, there is one rotor disc 141 for each of the plurality of blade rows 151.

The plurality of cavities 133 that configure one cavity group 132 are formed between two of the rotor discs 141 adjacent in the axial direction Da, like the cavities 33 of the compressor rotor shaft 21.

A blade attachment part 149 for attaching the blade roots 155 of the plurality of blades 152 configuring one of the blade rows 151 is formed on the radially outer side Dro of each of the rotor discs 141.

An upstream first concave part 143u and an upstream second concave part 145u are formed in each of the rotor discs 141. In order to form the outer cavity 133o on the axially upstream side Dau of the rotor disc 141, the upstream first concave part 143u is recessed toward the axially downstream side Dad from part on the axially upstream side Dau in the rotor disc 141. In order to form the inner cavity 133i on the axially upstream side Dau of the rotor disc 141, the upstream second concave part 145u is recessed toward the axially downstream side Dad from part on the axially upstream side Dau in the rotor disc 141 in a position farther on the radially inner side Dri than the upstream first concave part 143u. Therefore, a ring-shaped upstream first arm part 142u protruding toward the axially upstream side Dau relative to a bottom surface of the upstream first concave part 143u is formed on the radially outer side Dro of the upstream first concave part 143u. Furthermore, a ring-shaped upstream second arm part 144u protruding toward the axially upstream side Dau relative to the bottom surface of the upstream first concave part 143u and a bottom surface of the upstream second concave part 145u is formed between the upstream first concave part 143u and the upstream second concave part 145u.

A plurality of upstream linking grooves 144up recessed toward the axially downstream side Dad for linking the upstream first concave part 143u and the upstream second concave part 145u are formed in the ring-shaped upstream second arm part 144u. The plurality of upstream linking grooves 144up are aligned in the circumferential direction Dc. The upstream linking groove 144up is formed, for example, by cutting out a part of a tooth of the aforementioned gear coupling in the rotor disc 141.

Furthermore, a downstream first concave part 143d and a downstream second concave part 145d are formed in each of the rotor discs 141. In order to form the outer cavity 133o on the axially downstream side Dad of the rotor disc 141, the downstream first concave part 143d is recessed toward the axially, upstream side Dau from part on the axially downstream side Dad in the rotor disc 141. In order to form the inner cavity 133i on the axially downstream side Dad of the rotor disc 141, the downstream second concave part 145d is recessed toward the axially upstream side Dau from part on the axially downstream side Dad in the rotor disc 141 in a position farther on the radially inner side Dri than the downstream first concave part 143d. Therefore, a ring-shaped downstream first arm part 142d protruding toward the axially downstream side Dad relative to a bottom surface of the downstream first concave part 143d is formed on the radially outer side Dro of the downstream first concave part 143d. Furthermore, a ring-shaped downstream second arm part 144d protruding toward the axially downstream side Dad relative to the bottom surface of the downstream first concave part 143d and a bottom surface of the downstream second concave part 145*d* is formed between the downstream first concave part 143*d* and the downstream second concave part 145*d*.

A plurality of downstream linking grooves 144*dp* recessed toward the axially upstream side Dau for linking the downstream first concave part 143*d* and the downstream second concave part 145*d* are formed in the ring-shaped downstream second arm part 144*d*. The plurality of downstream linking grooves 144*dp* are aligned in the circumferential direction Dc. The downstream linking groove 144*dp* is formed, for example, by cutting out a part of a tooth of the aforementioned gear coupling in the rotor disc 141.

The outer cavity 133*o* is defined by the downstream first concave part 143*d* in the rotor disc 141 on the axially upstream side Dau of the two rotor discs 141 adjacent in the axial direction Da, and the upstream first concave part 143*u* in the rotor disc 141 on the axially downstream side Dad. The inner cavity 133*i* is defined by the downstream second concave part 145*d* in the rotor disc 141 on the axially upstream side Dau of the two rotor discs 141 adjacent in the axial direction Da, and the upstream second concave part 145*u* in the rotor disc 141 on the axially downstream side Dad.

The downstream first arm part 142*d* in the rotor disc 141 on the axially upstream side Dau of the two rotor discs 141 adjacent in the axial direction Da, and the upstream first arm part 142*u* in the rotor disc 141 on the axially downstream side Dad face each other and are separated from each other in the axial direction Da.

The plurality of downstream linking grooves 144*dp* in the rotor disc 141 on the axially upstream side Dau of the two rotor discs 141 adjacent in the axial direction Da, and the plurality of upstream linking grooves 144*up* in the rotor disc 141 on the axially downstream side Dad face each other in the axial direction Da. A linking hole is defined by the downstream linking groove 144*dp* and the upstream linking groove 144*up*. The pin hole in which the torque pin is mounted is made cylindrical to correspond to the shape of the cylindrical torque pin.

A bolt through hole 138 into which the spindle bolt 129 is inserted is formed in the rotor disc 141 so as to penetrate from the bottom surface of the upstream second concave part 145*u* to the bottom surface of the downstream second concave part 145*d*. The spindle hole 129 has a round cross-sectional shape in a direction perpendicular to the axial direction Da. Meanwhile, a cross-sectional shape of the bolt through hole 138 in the axial direction Da is an egg shape, and the like. Therefore, when the spindle bolt 129 is inserted into the bolt through hole 138, a gap 138*s* is formed between part of an outer circumferential surface of the spindle bolt 129 and part of an inner circumferential surface of the bolt through hole 138. The gap 138*s* forms a first mixed air flow path 134 penetrating from the bottom surface of the upstream second concave part 145*u* to the bottom surface of the downstream second concave part 145*d*. Note that the cross-sectional shape of the bolt through hole may be any shape as long as the gap 138*s* is formed between part of the outer circumferential surface of the spindle bolt 129 and part of the inner circumferential surface of the bolt through hole 138, and, for example, may be a shape combining two circles that have mutually different center positions and partially overlap one another, and the like.

As illustrated in FIG. 6, a part farther on the radially outer side Dro than the upstream second arm part 144*u* of a first rotor disc 141*a* farthest on the axially upstream side Dau of the plurality of rotor discs 141 faces the air introduction space 184. A second cooling air flow path 122 is formed in the first rotor disc 141*a*. The second cooling air flow path 122 penetrates to an outer surface of the blade attachment part 149 from a surface facing the air introduction space 184 in the first rotor disc 141*a*. Therefore, the cooling air Ac in the air introduction space 184 is sent to each of the blades 152 of a first blade row 151*a* attached to the first rotor disc 141*a* through the second cooling air flow path 122 and the blade attachment part 149.

A part farther on the radially inner side Dri than the upstream second arm part 144*u* of the first rotor disc 141*a*, more specifically, a surface forming the upstream second concave part 45*u* faces the mixing space 177. Therefore, mixed air Am flows into the first mixed air flow path 134 formed in the first rotor disc 141*a* and open in the bottom surface of the upstream second concave part 45*u* thereof. The mixed air Am flows into the inner cavity 133*i* formed between the first rotor disc 141*a* and a second rotor disc 141*b* from the first mixed air flow path 134 of the first rotor disc 141*a*. Subsequently, the mixed air Am flows into the inner cavity 133*i* formed between each of the rotor discs 141 through the first mixed air flow path 134 formed in each of the first rotor discs 141.

The aforementioned plurality of through holes, formed between each of the first rotor disc 141*a* and the plurality of rotor discs 141 farther on the axially downstream side Dad than the first rotor disc 141*a*, form a second mixed air flow path 135 linking the outer cavity 133*o* and the inner cavity 133*i* formed between the two rotor discs 141 adjacent in the axial direction Da. Therefore, the mixed air Am in the inner cavity 133*i* formed between each of the first rotor disc 141*a* and the plurality of rotor discs 141 farther on the axially downstream side Dad than the first rotor disc 141*a* flows into the outer cavity 133*o* formed between each of these rotor discs 141 through the second mixed air flow path 135. Note that while a linking hole, formed by cutting out a tip of a tooth of the aforementioned gear coupling in the rotor disc 141, is used as the second mixed air flow path 135 here, a separate hole may be formed, and that hole may be used as the second mixed air flow path 135.

A third mixed air flow path 136 penetrating to an outer surface of the blade attachment part 149 from a surface forming the upstream first concave part 143*u* is formed in the plurality of rotor discs 141 farther on the axially downstream side Dad than the first rotor disc 141*a*. Therefore, the mixed air Am in the inner cavity 133*i* formed between each of the first rotor disc 141*a* and the plurality of rotor discs 141 farther on the axially downstream side Dad than the first rotor disc 141*a* flows into air flow paths 156 of the blades 152 attached to the plurality of rotor discs 141 farther on the axially downstream side Dad than the first rotor disc 141*a* through the third mixed air flow path 136.

A mixed air flow path 137 of the turbine rotor shaft 121 through which the mixed air Am flows is configured having the first mixed air flow path 134, inner cavity 133*i*, second mixed air flow path 135, outer cavity 133*o*, and third mixed air flow path 136.

The operation of the gas turbine equipment described above will be described next.

As illustrated in FIG. 1 and FIG. 2, when the compressor rotor 20 rotates, the outside air A flows into the air compression flow path 15 from the air intake port 12 of the compressor 10. The air A is gradually compressed through the process of flowing toward the axially downstream side Dad from the axially upstream side Dau in the air compression flow path 15, to thus become the compressed air Acom. The compressed air Acom from the air compression flow path 15 flows into the intermediate casing 191 from the air discharge port 18 of the compressor 10 through the air discharge flow path 17.

Part of the compressed air Acom that has flowed into the intermediate casing 191 flows into the combustor 80, as illustrated in FIG. 1 and FIG. 5. The fuel F is also supplied into the combustor 80 from the fuel supply source.

In the combustor 80, the fuel F is burned in the compressed air Acom to generate a high-temperature, high-pressure combustion gas G.

As illustrated in FIG. 1 and FIG. 6, the high-temperature, high-pressure combustion gas G flows into the combustion gas flow path 115 of the turbine 110 from the combustor 80. Through the process of flowing in the combustion gas flow path 115, the combustion gas G rotates the turbine rotor 120. A temperature of the combustion gas G has reached as high as one thousand and several hundred degrees centigrade when flowing in the combustion gas flow path 115 of the turbine 110 from the combustor 80. The temperature of the combustion gas G gradually drops as the combustion gas G flows in the combustion gas flow path 115.

Another part of the compressed air Acom that has flowed into the intermediate casing 191 flows into the cooler 205 through the cooling air line 201 of the cooling system 200, as illustrated in FIG. 1 and FIG. 5. The compressed air Acom flows into and is cooled by the cooler 205, thus becoming the cooling air Ac. Here, a temperature of the compressed air Acom that has flowed into the intermediate casing 191 is, for example, 500° C. Furthermore, the temperature of the compressed air Acom cooled by the cooler 205, that is, the cooling air Ac is, for example, 200° C. The cooling air Ac flows into the air introduction space 184 of the intermediate rotor shaft cover 181 through the cooling air line 201 and the cooling air pipe 189 provided in the intermediate casing 191. Part of the cooling air Ac that has flowed into the air introduction space 184 flows into the air flow path 156 of each of the blades 152 of the first blade row 151a attached to the first rotor disc 141a through the second cooling air flow path 122 formed in the first rotor disc 141a of the turbine 110. The cooling air Ac cools the blade 152 through the process of flowing through the air flow path 156 of the blade 152. The cooling air Ac flows outside the blade 152, that is, flows out into the combustion gas flow path 115 through the air flow path 156. Therefore, with the present embodiment, the plurality of blades 152 attached to the first rotor disc 141a, in other words, a plurality of first-stage blades 152, are cooled, for example, by 200° C. cooling air Ac.

Part of the compressed air Acom flowing in the air compression flow path 15 of the compressor 10 flows into the ventilation flow path 22 from the inflow port 25 of the ventilation flow path 22 formed in the compressor rotor shaft 21 as the compressor extracted air Bcom, as illustrated in FIG. 1 and FIG. 2. In other words, the part of the compressed air Acom flowing in the air compression flow path 15 of the compressor 10 flows in between the intermediate rotor discs 41a adjacent in the axial direction Da as the compressor extracted air Bcom. The compressor extracted air Bcom that has flowed into the ventilation flow path 22 from the inflow port 25 of the ventilation flow path 22 flows into the distribution part 26 extending in the axial direction Da through the inflow part 24 extending in the radial direction Dr in the ventilation flow path 22. The compressor extracted air Bcom that has flowed into the distribution part 26 flows into the plurality of branch parts 27 formed in mutually different positions in the axial direction Da. All of the compressor extracted air Bcom that has flowed into each of the branch parts 27 flows into the collection part 28 extending in the axial direction Da and flows through the collection part 28, out into the mixing space 177 in the intermediate rotor shaft 171.

Incidentally, as illustrated in FIG. 4, there is clearance between an end on the radially outer side Dro of the blade 52 of the compressor 10 and an inner circumferential surface of the compressor casing 11 facing this end on the radially outer side Dro in the radial direction Dr. This clearance is generally referred to as tip clearance CC and is preferably, from the perspective of compressor performance, as small as possible.

The dimension in the radial direction Dr of the compressor rotor 20, and the compressor rotor shaft 21 in particular, is larger than the thickness dimension in the radial direction Dr of the compressor casing 11. Therefore, the compressor rotor 20 has a larger heat capacity than the compressor casing 11, and thus the thermal responsiveness of the compressor rotor 20 to temperature changes in the compressed air Acom flowing through the air compression flow path 15 is lower than that of the compressor casing 11. Therefore, when the temperature of the compressed air Acom flowing through the air compression flow path 15 changes, the tip clearance CC changes due to differences in the thermal responsiveness between the compressor rotor 20 and the compressor casing 11.

In a case where changes in the tip clearance CC are large, the regular clearance needs to be enlarged. Note that the regular clearance is the tip clearance CC when the stable operation of the gas turbine 1 is continuous and the temperatures of both the compressor rotor 20 and the compressor casing 11 are continuously the same. When the regular clearance is large, the flow rate of the compressed air Acom passing between the end on the radially outer side Dro of the blade 52 and the inner circumferential surface of the compressor casing 11 during steady operation of the gas turbine 1 increases. Therefore, when the regular clearance is large, not only does compressor performance decrease during steady operation of the gas turbine 1, but gas turbine performance also decreases.

Thus, with the present embodiment, because the compressor extracted air Bcom extracted from the air in the compression flow path 15 flows in the compressor rotor shaft 21 and thus ventilates the interior of the compressor rotor shaft 21, as described above, the thermal responsiveness of the compressor rotor 20 rises with respect to temperature changes in the compressed air Acom flowing through the air compression flow path 15, which thus decreases the changes in the tip clearance CC. With the present embodiment, because changes in the tip clearance CC are thus small during startup, the regular clearance can be made small. Therefore, with the present embodiment, compressor performance can be raised during steady operation of the gas turbine 1, and, as a result, gas turbine performance can also be raised.

With an axial flow compressor, the pressure and the temperature both rise in a process of flowing from the axially upstream side Dau to the axially downstream side Dad. Therefore, temperature changes between when the axial flow compressor is stopped and when it is running are larger in parts on the axially downstream side Dad thereof than in parts on the axially upstream side Dau thereof. Thus, as illustrated in FIG. 2, with the present embodiment, part of the compressed air Acom flowing between the two intermediate blade rows 51a flows between each of the rotor disc 41 farthest on the axially downstream side Dad and the plurality of rotor discs 41 farther on the axially upstream side Dau than this rotor disc 41 as the compressor extracted air Bcom, which thus raises the thermal responsiveness of the part on the axially downstream side Dad within the compressor rotor 20.

As illustrated in FIG. 1 and FIG. 5, the cooling air Ac generated by the cooling system 200 also flows into the mixing space 177 in the intermediate rotor shaft 171, in addition to the compressor extracted air Bcom from the compressor rotor shaft 21. The cooling air Ac generated by the cooler 205 of the cooling system 200 flows through the cooling air line 201 and the cooling air pipe 189 provided in the intermediate casing 191, into the air introduction space 184 of the intermediate rotor shaft cover 181. Part of the cooling air Ac that has flowed into the air introduction space 184 flows into the mixing space 177 in the intermediate rotor shaft 171 through the first cooling air flow path 178 formed in the intermediate rotor shaft 171. As described above, the temperature of the cooling air Ac is, for example, 200° C. Furthermore, the temperature of the compressor extracted air Bcom flowing into the mixing space 177 from the compressor rotor shaft 21 is, for example, 400° C. The compressor extracted air Bcom from the compressor rotor shaft 21 and the cooling air Ac from the cooling system 200 are mixed in the mixing space 177, thus becoming, for example, 300° C. mixed air Am.

The mixed air Am flows into the inner cavity 133$i$ between the first rotor disc 141$a$ and the second rotor disc 141$b$ through the first mixed air flow path 134 formed in the first rotor disc 141$a$ of the turbine 110, as illustrated in FIG. 1 and FIG. 6. Part of the mixed air Am that has flowed into the inner cavity 133$i$ flows into the outer cavity 133$o$ between the first rotor disc 141$a$ and the second rotor disc 141$b$ through the second mixed air flow path 135. The mixed air Am flows into the air flow paths 156 of the plurality of blades 152 attached to the second rotor disc 141$b$ through the third mixed air flow path 136 formed in the second rotor disc 141$b$. The mixed air Am cools the blade 152 through the process of flowing through the air flow path 156 of the blade 152. The mixed air Am flows outside the blade 152, that is, flows out into the combustion gas flow path 115 through the air flow path 156.

Another part of the mixed air Am that has flowed into the inner cavity 133$i$ between the first rotor disc 141$a$ and the second rotor disc 141$b$ flows into the inner cavity 133$i$ between the second rotor disc 141$b$ and a third rotor disc 141$c$ through the first mixed air flow path 134 formed in the second rotor disc 141$b$. Part of the mixed air Am that has flowed into the inner cavity 133$i$ flows into the outer cavity 133$o$ between the second rotor disc 141$b$ and the third rotor disc 141$c$ through the second mixed air flow path 135. The mixed air Am flows into the air flow paths 156 of the plurality of blades 152 attached to the third rotor disc 141$c$ through the third mixed air flow path 136 formed in the third rotor disc 141$c$. The mixed air Am cools the blade 152 through the process of flowing through the air flow path 156 of the blade 152. The mixed air Am flows outside the blade 152, that is, flows out into the combustion gas flow path 115 through the air flow path 156.

Therefore, with the present embodiment, the turbine rotor shaft 121 is cooled by, for example, the 300° C. mixed air Am. Additionally, with the present embodiment, the plurality of blades 152 attached to the second rotor disc 141$b$ and the third rotor disc 141$c$ are also cooled by the 300° C. mixed air Am.

Suppose that the compressor extracted air Bcom that has flowed out from the compressor rotor shaft 21 is guided as-is to the turbine rotor shaft 121. In this case, the plurality of blades 152 attached to the turbine rotor shaft 121 would be cooled by, for example, 400° C. air. By contrast, with the present embodiment, each of the blades 152 of the first blade row 151$a$ of the turbine 110 is cooled by the cooling air Ac (for example, 200° C.) from the cooling system 200. Furthermore, with the present embodiment, each of the blades 152 of the blade row 151 farther on the axially downstream side Dad than the first blade row 151$a$ of the turbine 110 is cooled by the mixed air Am (for example, 300° C.) of the cooling air Ac from the cooling system and the compressor extracted air Bcom from the compressor rotor shaft 21.

Therefore, with the present embodiment, the blade 152 of the turbine 110 can be cooled by lower-temperature air than in cases where the blade 152 of the turbine 110 is cooled by the compressor extracted air Bcom that has flowed out from the compressor rotor shaft 21. Furthermore, with the present embodiment, each of the blades 152 of the first blade row 151$a$, of the blades 152 of the turbine 110, exposed to the highest-temperature combustion gas G is cooled by 200° C. cooling air Ac. Therefore, with the present embodiment, the temperature of the combustion gas G generated by the combustor 80 can be raised, and, as a result, an output of the gas turbine 1 can be enhanced.

First Modified Example of the Compressor Rotor

A first modified example of the compressor rotor described above in the embodiment will be described using FIG. 8.

With the compressor rotor 20 according to the embodiment described above, the compressed air Acom in the air compression flow path 15 is guided into the compressor rotor shaft 21 from one location in the axial direction Da of the compressor rotor shaft 21 as the compressor extracted air Bcom. That is, the ventilation flow path 22 according to the above-described embodiment has the one location in the axial direction Da as the inflow port 25.

Figure 8:
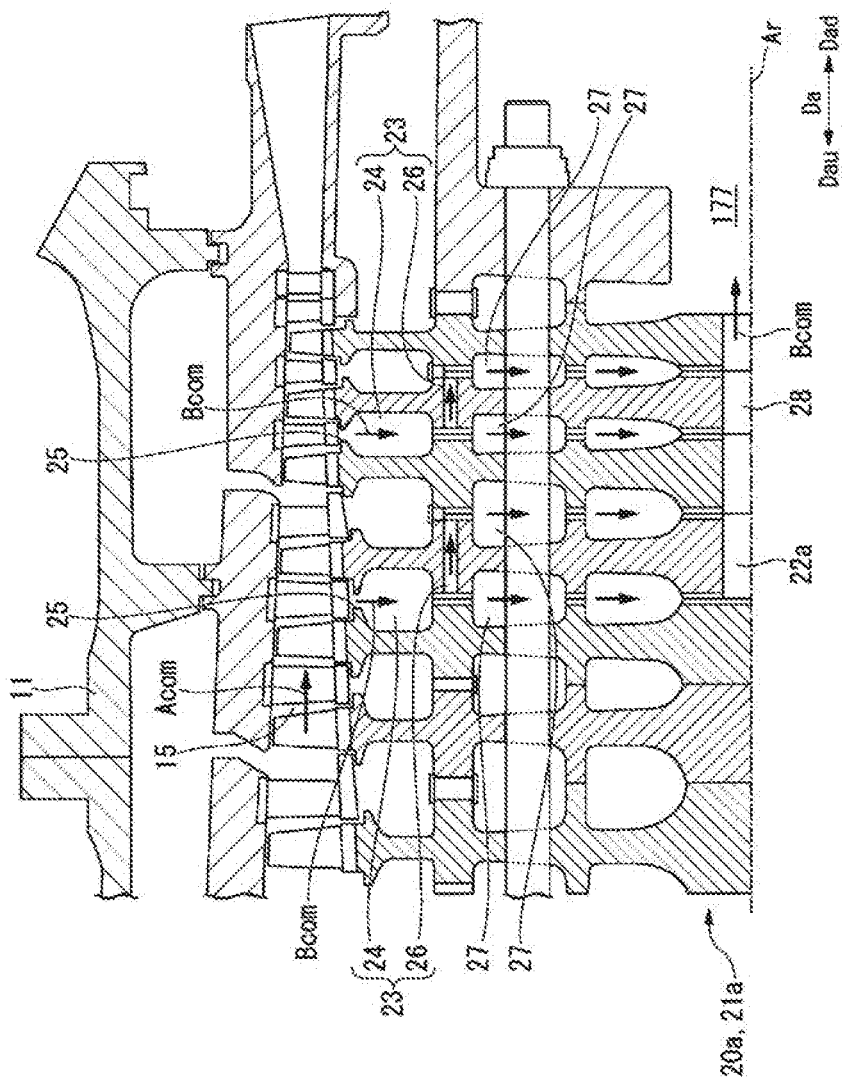
FIG. 8 is a cross-sectional view of main components of a compressor in a first modified example of the embodiment according to the present invention.

However, like a compressor rotor 20$a$ according to the present modified example illustrated in FIG. 8, the compressed air Acom in the air compression flow path 15 may be guided into a compressor rotor shaft 21$a$ as the compressor extracted air Bcom from a plurality of locations in the axial direction Da of the compressor rotor shaft 21$a$. That is, a ventilation flow path 22$a$ according to the present modified example has the plurality of locations in the axial direction Da as the inflow port 25. In this case, after the compressor extracted air Bcom has been guided into the compressor rotor shaft 21$a$ from one location in the axial direction Da of the compressor rotor shaft 21$a$, said compressor extracted air Bcom may be distributed to mutually different positions in the axial direction Da of the compressor rotor shaft 21$a$, while, at the same time, after the compressor extracted air Bcom has been guided into the compressor rotor shaft 21$a$ from another location in the axial direction Da of the compressor rotor shaft 21$a$, said compressor extracted air Bcom may be distributed to mutually different positions in the axial direction Da of the compressor rotor shaft 21$a$.

Second Modified Example of the Compressor Rotor

A second modified example of the compressor rotor described above in the embodiment will be described using FIG. 9.

With the compressor rotor 20 according to the embodiment described above, after the compressed air Acom in the air compression flow path 15 is guided into the compressor rotor shaft 21 as the compressor extracted air Bcom, the compressor extracted air Bcom is distributed to the axially upstream side Dau and to the axially downstream side Dad. That is, the ventilation flow path 22 according to the embodiment described above uses the inflow part 24 as a reference to extend the distribution part 26 toward the axially upstream side Dau and toward the axially downstream side Dad, and has the plurality of branch parts 27 connected to each of the distribution part 26 on the axially upstream side Dau and the distribution part 26 on the axially downstream side Dad.

Figure 9:
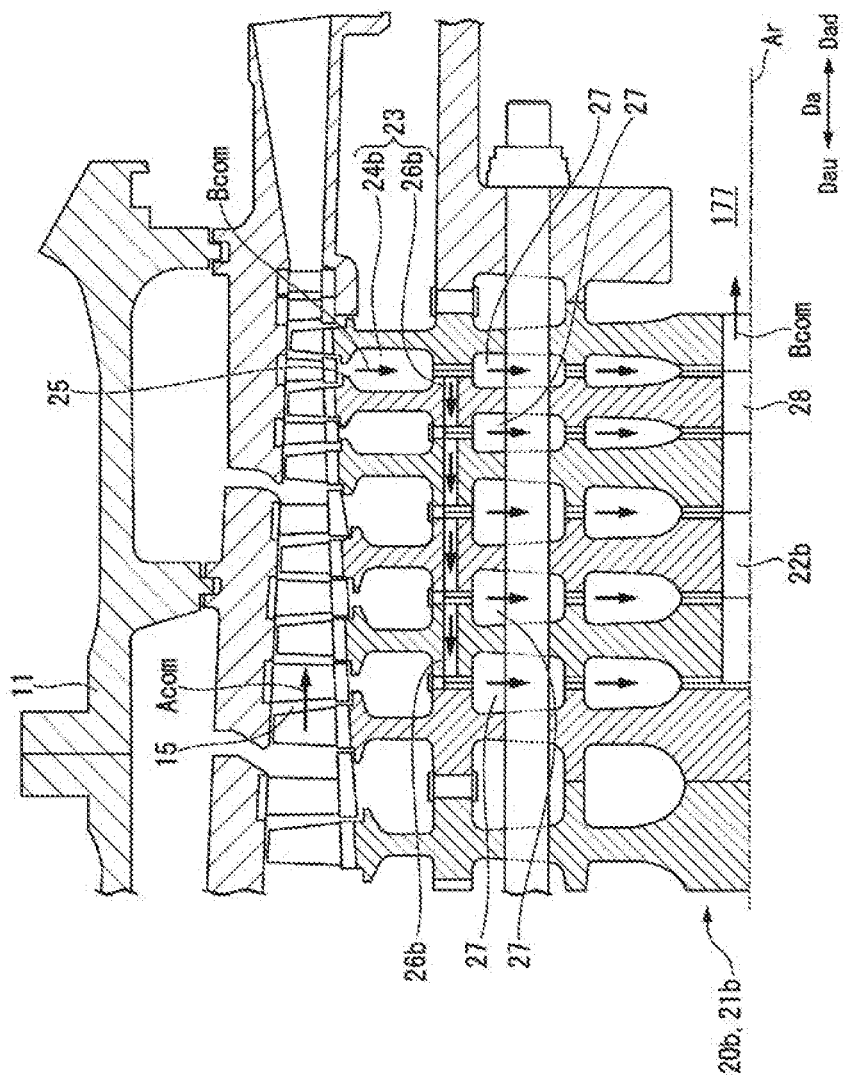
FIG. 9 is a cross-sectional view of main components of a compressor in a second modified example of the embodiment according to the present invention.

However, like a compressor rotor 20b of the present modified example illustrated in FIG. 9, after the compressed air Acom in the air compression flow path 15 is guided into a compressor rotor shaft 21b as the compressor extracted air Bcom, the compressor extracted air Bcom may be distributed only to a plurality of locations on the axially upstream side Dau. That is, a ventilation flow path 22b according to the present modified example uses an introduction part 24b as a reference to extend a distribution part 26b only toward the axially upstream side Dau, and has the plurality of branch parts 27 connected to the distribution part 26b.

Note that after the compressed air Acom in the air compression flow path 15 is guided into the compressor rotor shaft 21b as the compressor extracted air Bcom, the compressor extracted air Bcom may be distributed only to a plurality of locations on the axially downstream side Dad.

Third Modified Example of the Compressor Rotor

A third modified example of the compressor rotor described above in the embodiment will be described using FIG. 10.

With the compressor rotor 20 according to the embodiment described above, after the compressed air Acom in the air compression flow path 15 is guided into the compressor rotor shaft 21 as the compressor extracted air Bcom, the compressor extracted air Bcom is distributed to mutually different positions in the axial direction Da. That is, the ventilation flow path 22 according to the above-described embodiment has the plurality of the branch parts 27 in mutually different positions in the axial direction Da.

Figure 10:
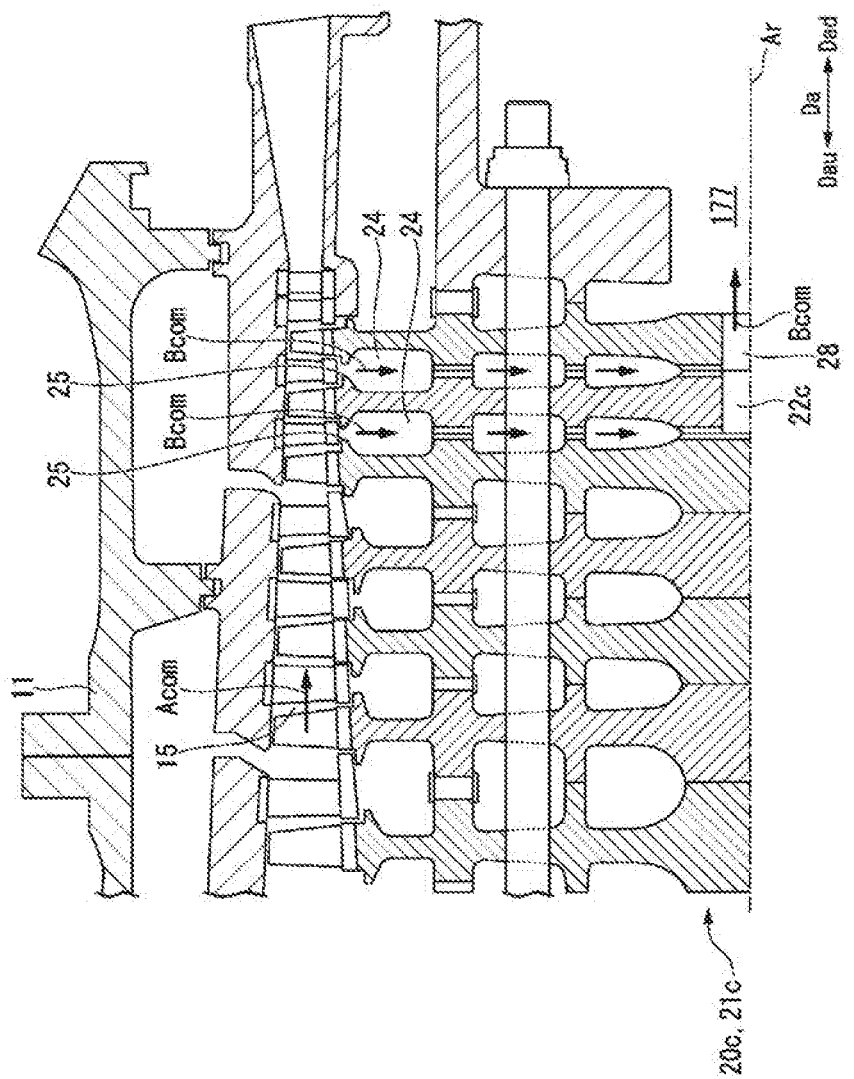
FIG. 10 is a cross-sectional view of main components of a compressor in a third modified example of the embodiment according to the present invention.

However, like a compressor rotor 20c of the present modified example illustrated in FIG. 10, after the compressed air Acom in the air compression flow path 15 is guided into a compressor rotor shaft 21c as the compressor extracted air Bcom, the compressor extracted air Bcom may flow out into the mixing space 177 as-is without being distributed to a plurality of mutually different locations in the axial direction Da. That is, while the ventilation flow path 22c according to the present modified example has the inflow part 24, there are no parts therein that equate to the distribution part 26 or the branch part 27 of the embodiment described above. In this case, a plurality of the inflow parts 24 can be formed in mutually different positions in the axial direction Da, and the compressor extracted air Bcom that has flowed into the inflow parts 24 can be made to flow out into the mixing space 177 as-is, without being distributed to a plurality of mutually different locations in the axial direction Da.

Modified Example of the Turbine Rotor

Figure 11:
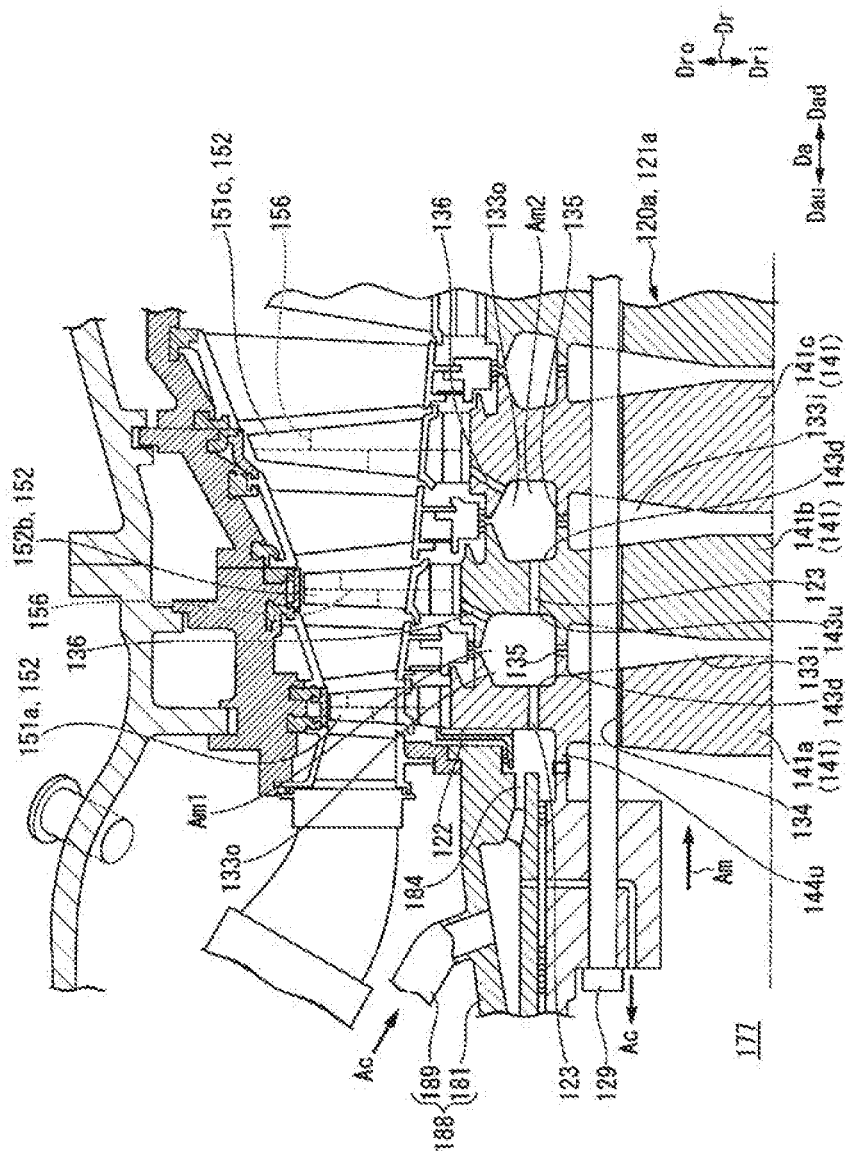
FIG. 11 is a cross-sectional view of main components of a turbine in a modified example of the embodiment according to the present invention.

A modified example of the turbine rotor described above in the embodiment will be described using FIG. 11.

In the turbine rotor 120 according to the embodiment described above, the cooling air Ac from the cooling system 200 is guided only to the first blade row 151a. However, as with a turbine rotor 120a of the present modified example illustrated in FIG. 11, the cooling air Ac may be guided not only to the first blade row 151a but also to the second blade row 151b and the third blade row 151c that are farther on the axially downstream side Dad than the first blade row 151a.

A third cooling air flow path 123 penetrating in the axial direction Da is formed in, of the plurality of rotor discs 141 that configure a turbine rotor shaft 121a according to the present modified example, the first rotor disc 141a farthest on the axially upstream side Dau and the second rotor disc 141b adjacent to the first rotor disc 141a on the axially downstream side Dad. The third cooling air flow path 123 formed in the first rotor disc 141a extends from a part that is farther on the radially outer side Dro than the upstream second arm part 144u of the first rotor disc 141a, from a position facing the air introduction space 184, toward the axially downstream side Dad and opens in the bottom surface of the downstream first concave part 143d of the first rotor disc 141a. Therefore, the outer cavity 133o between the first rotor disc 141a and the second rotor disc 141b and the air introduction space 184 are linked through the third cooling air flow path 123. Furthermore, the third cooling air flow path 123 formed in the second rotor disc 141b extends toward the axially downstream side Dad from the bottom surface of the upstream first concave part 143u of the second rotor disc 141b and opens in the bottom surface of the downstream first concave part 143d of the second rotor disc 141h Therefore, the outer cavity 133o between the first rotor disc 141a and the second rotor disc 141b and the outer cavity 133o between the second rotor disc 141b and the third rotor disc 141c are linked through the third cooling air flow path 123.

With the present modified example, the mixed air Am in the inner cavity 133i between the first rotor disc 141a and the second rotor disc 141h flows into the outer cavity 133o between the first rotor disc 141a and second rotor disc 141b through the second mixed air flow path 135. Furthermore, the cooling air Ac in the air introduction space 184 flows into the outer cavity 133o through the third cooling air flow path 123 of the first rotor disc 141a. Therefore, for example, 200° C. cooling air Ac mixes with 300° C. mixed air Am in the outer cavity 133o between the first rotor disc 141a and the second rotor disc 141b. As a result, mixed air Am1, which has a lower temperature than the mixed air Am generated in the mixing space 177, is generated in the outer cavity 133o. Part of the mixed air Am1 flows into the air flow path 156 of each of the blades 152 of the second blade row 151h attached to the second rotor disc 141b through the third mixed air flow path 136 formed in the second rotor disc 141b.

Another part of the mixed air Am1 in the outer cavity 133o between the first rotor disc 141a and the second rotor disc 141b flows into the outer cavity 133o between the second rotor disc 141h and the third rotor disc 141c through the third cooling air flow path 123 formed in the second rotor disc 141b. The mixed air Am in the inner cavity 133i between the second rotor disc 141b and the third rotor disc 141c flows into the outer cavity 133o through the second mixed air flow path 135. Therefore, 300° C. mixed air Am mixes with the mixed air Am1 having a temperature lower than 300° C. in the outer cavity 133o between the second rotor disc 141b and the third rotor disc 141c. As a result, mixed air Am2, which has a lower temperature than the mixed air Am generated in the mixing space 177, is generated in the outer cavity 133o. Part of the mixed air Am2 flows into the air flow path 156 of each of the blades 152 of the third blade row 151c attached to the third rotor disc 141c through the third mixed air flow path 136 formed in the third rotor disc 141c.

Therefore, with the present modified example, lower-temperature air can be supplied to the plurality of blades 152 attached to the second rotor disc and the third rotor disc than with the embodiment described above.

INDUSTRIAL APPLICABILITY

With an aspect of the present invention, the turbine rotor can be cooled to a greater degree.

REFERENCE NUMERALS

1 Gas turbine
2 Gas turbine rotor
3 Gas turbine casing
9 Generator
10 Compressor
11 Compressor casing
12 Air intake port
13 Compressor casing main body
14 Vane retaining ring
15 Air compression flow path
16 Diffuser
17 Air discharge flow path
18 Air discharge port
20, 20a, 20b, 20c Compressor rotor
21, 21a, 21b, 21c Compressor rotor shaft
22, 22a, 22b, 22c Ventilation flow path
23 Introduction part
24, 24b Inflow part
25 Inflow port
26 Distribution part
27 Branch part
28 Collection part
29 Spindle bolt
32 Cavity group
33 Cavity
33o Outer cavity
33m Intermediate cavity
33i Inner cavity
38 Bolt through hole
39, 39a Torque pin
41 Rotor disc
41a Intermediate rotor disc
49 Blade attachment part
51 Blade row
51a Intermediate blade row
52 Blade
61 Vane row
62 Vane
80 Combustor
110 Turbine
111 Turbine casing
115 Combustion gas flow path
120, 120a Turbine rotor
121, 121a Turbine rotor shaft
122 Second cooling air flow path
123 Third cooling air flow path
129 Spindle bolt
132 Cavity group
133 Cavity
133o Outer cavity
133i Inner cavity
134 First mixed air flow path
135 Second mixed air flow path
136 Third mixed air flow path
137 Mixed air flow path
138 Bolt through hole
138s Gap
141 Rotor disk
141a First rotor disk
141b Second rotor disk
141c Third rotor disk
149 Blade attachment part
151 Blade row
151a First blade row
151b Second blade row
151c Third blade row
152 Blade
156 Air flow path
161 Vane row
161a First vane row
162 Vane
171 Intermediate rotor shaft
177 Mixing space
178 First cooling air flow path (or simply cooling air flow path)
181 Intermediate rotor shaft cover
184 Air introduction space
188 Cooling air introduction member
189 Cooling air pipe
191 Intermediate casing
200 Cooling system
201 Cooling air line
205 Cooler

The invention claimed is:

1. A gas turbine rotor inside a gas turbine casing, the gas turbine rotor comprising:
   a compressor rotor of a compressor that rotates around an axial line extending in an axial direction of the gas turbine rotor;
   an intermediate rotor shaft that rotates around the axial line and is connected to the compressor rotor;
   a turbine rotor of a turbine, connected to the compressor rotor via the intermediate rotor shaft, that rotates integrally with the compressor rotor around the axial line;
   a ventilation flow path configured to guide compressed air flowing inside the gas turbine casing to an interior of the compressor rotor, wherein the ventilation flow path is axially upstream of an air discharge port of the compressor;
   a cooling air flow path configured to guide cooling air having a lower temperature than that of the compressed air flowing through the ventilation flow path to a part of the gas turbine rotor that is axially downstream of the air discharge port of the compressor, wherein the cooling air flow path is formed in the intermediate rotor shaft;
   a mixing space which is connected to the ventilation flow path and the cooling air flow path, and in which the compressed air that has flowed through the ventilation flow path and the cooling air that has flowed through the cooling air flow path are mixed; and
   a mixed air flow path that is connected to the mixing space and guides mixed air generated by the mixing of the compressed air and the cooling air into the turbine rotor.

2. The gas turbine rotor according to claim 1, wherein the mixing space is formed in the intermediate rotor shaft.

3. The gas turbine rotor according to claim 1, wherein the compressor rotor has a compressor rotor shaft and a plurality of blade rows attached to an outer circumference of the compressor rotor shaft and aligned in the axial direction, and the ventilation flow path has an introduction part for guiding the compressed air flowing between two blade rows adjacent in the axial direction of the plurality of blade rows of the compressor rotor to the interior of the compressor rotor, a plurality of branch parts which branch from the introduction part and are formed in mutually different positions in the axial direction, and into which the compressed air flows from the introduction part, and a collection part which is connected to each of the plurality of branch parts, into which the compressed air flows after passing through the plurality of branch parts, and through which the compressed air that has flowed in flows out to the mixing space.

4. A gas turbine comprising:
the gas turbine rotor according to claim 1; and
the gas turbine casing.

5. A gas turbine assembly comprising:
the gas turbine according to claim 4; and
a cooling system for generating the cooling air by cooling the compressed air which is air compressed by the compressor of the gas turbine, wherein
the gas turbine has a cooling air introduction member for guiding the cooling air generated in the cooling system to the cooling air flow path of the gas turbine rotor.

6. A gas turbine rotor inside a gas turbine casing, the gas turbine rotor comprising:
a compressor rotor of a compressor that rotates around an axial line extending in an axial direction of the gas turbine rotor;
a turbine rotor of a turbine connected to the compressor rotor and rotates integrally with the compressor rotor around the axial line;
a ventilation flow path configured to guide compressed air flowing inside the gas turbine casing to an interior of the compressor rotor, wherein the ventilation flow path is axially upstream of an air discharge port of the compressor;
a cooling air flow path configured to guide cooling air having a lower temperature than that of the compressed air flowing through the ventilation flow path to a part of the gas turbine rotor that is axially downstream of the air discharge port of the compressor;
a mixing space which is connected to the ventilation flow path and the cooling air flow path, and in which the compressed air that has flowed through the ventilation flow path and the cooling air that has flowed through the cooling air flow path are mixed; and
a mixed air flow path that is connected to the mixing space and guides mixed air generated by the mixing of the compressed air and the cooling air into the turbine rotor, wherein the turbine rotor has a turbine rotor shaft and a plurality of blade rows attached to an outer circumference of the turbine rotor shaft and aligned in the axial direction, and the mixed air flow path is connected through an interior of the turbine rotor shaft to a blade row of the plurality of blade rows, wherein the blade row is positioned axially downstream of a first blade row of the plurality of blade rows that is axially upstream of all other blade rows of the plurality of blade rows.

7. The gas turbine rotor according to claim 6, wherein, in addition to a first cooling air flow path which is the cooling air flow path connected to the mixing space, a second cooling air flow path for guiding the cooling air to the first blade row is also formed.

8. The gas turbine rotor according to claim 7, wherein a third cooling air flow path linking the second cooling air flow path and the mixed air flow path is formed in the turbine rotor.

9. The gas turbine rotor according to claim 6, wherein
the compressor rotor has a compressor rotor shaft and a plurality of blade rows attached to an outer circumference of the compressor rotor shaft and aligned in the axial direction, and the ventilation flow path has an introduction part for guiding the compressed air flowing between two blade rows adjacent in the axial direction of the plurality of blade rows of the compressor rotor to the interior of the compressor rotor, a plurality of branch parts which branch from the introduction part and are formed in mutually different positions in the axial direction, and into which the compressed air flows from the introduction part, and a collection part which is connected to each of the plurality of branch parts, into which the compressed air flows after passing through the plurality of branch parts, and through which the compressed air that has flowed in flows out to the mixing space.

10. A gas turbine comprising:
the gas turbine rotor according to claim 6; and
the gas turbine casing.

11. A gas turbine assembly comprising:
the gas turbine according to claim 10; and
a cooling system for generating the cooling air by cooling the compressed air which is air compressed by the compressor of the gas turbine, wherein
the gas turbine has a cooling air introduction member for guiding the cooling air generated in the cooling system to the cooling air flow path of the gas turbine rotor.

* * * * *